United States Patent
Kameyama

(10) Patent No.: US 7,439,849 B2
(45) Date of Patent: Oct. 21, 2008

(54) USER WELCOMING SYSTEM FOR AN AUTOMOBILE

(75) Inventor: Shogo Kameyama, Chiryu (JP)

(73) Assignee: Denso Corporation, Kariya (JP)

( * ) Notice: Subject to any disclaimer, the term of this patent is extended or adjusted under 35 U.S.C. 154(b) by 450 days.

(21) Appl. No.: 11/210,779

(22) Filed: Aug. 25, 2005

(65) Prior Publication Data

US 2006/0046684 A1 Mar. 2, 2006

(30) Foreign Application Priority Data

Aug. 31, 2004 (JP) ............................ 2004-253024

(51) Int. Cl.
*H04B 1/06* (2006.01)
*H04B 1/034* (2006.01)
(52) U.S. Cl. .................... 340/425.5; 455/92; 455/345; 340/426.13; 340/825.36
(58) Field of Classification Search ....... 455/41.2–41.3, 455/70, 92, 352–353, 344–345; 340/5.61, 340/5.64, 5.72, 825.69, 825.72, 426.13–426.17, 340/426.36, 825.36
See application file for complete search history.

(56) References Cited

U.S. PATENT DOCUMENTS

| | | | | |
|---|---|---|---|---|
| 6,101,428 A * | 8/2000 | Snyder | .......................... | 701/2 |
| 6,141,427 A | 10/2000 | Fukuda | | |
| 6,512,462 B1 * | 1/2003 | Robineau | ............... | 340/825.72 |
| 2001/0038328 A1 * | 11/2001 | King et al. | ................. | 340/5.64 |
| 2004/0075532 A1 * | 4/2004 | Ueda et al. | ................. | 340/5.72 |
| 2004/0178908 A1 * | 9/2004 | Sari et al. | ............. | 340/539.32 |
| 2005/0009511 A1 * | 1/2005 | Bostrom et al. | ............. | 455/419 |
| 2007/0197194 A1 * | 8/2007 | Oyagi et al. | ................ | 455/411 |

FOREIGN PATENT DOCUMENTS

| | | |
|---|---|---|
| JP | A-58-182397 | 10/1983 |
| JP | B2-3488749 | 3/1996 |
| JP | A-2002-123778 | 4/2002 |
| JP | A-2003-312391 | 11/2003 |
| JP | A-2003-340370 | 12/2003 |

* cited by examiner

*Primary Examiner*—Simon D Nguyen
(74) *Attorney, Agent, or Firm*—Posz Law Group, PLC

(57) ABSTRACT

A welcoming system for welcoming a user of an automobile has a host communication means provided in the automobile or a facility around a parking location of the automobile. The system further has a distance detecting means for detecting a distance between the user and the parking automobile. A welcoming control means operates a welcoming operating means, such as a head lamp of the automobile, in such a manner that a content of the welcoming operations will be selected and changed depending on the detected distance between the user and the automobile.

18 Claims, 29 Drawing Sheets

USER A

USER B

USER C

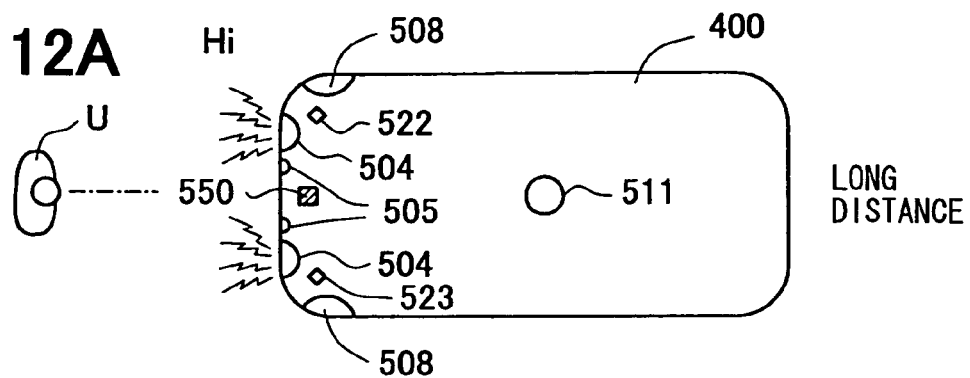
FIG. 12A — LONG DISTANCE
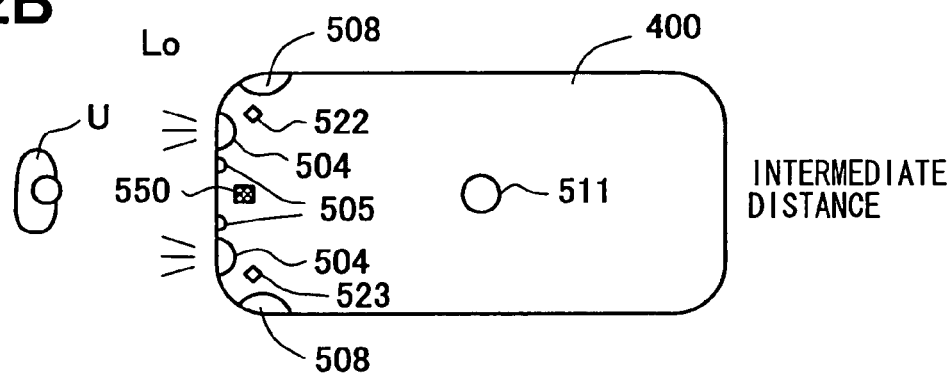
FIG. 12B — INTERMEDIATE DISTANCE
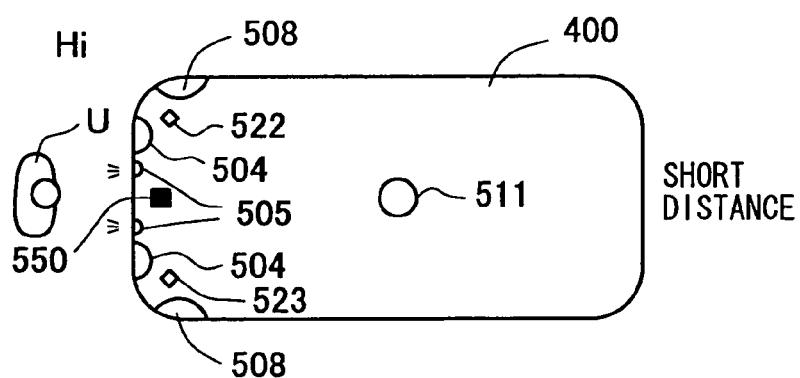
FIG. 12C — SHORT DISTANCE
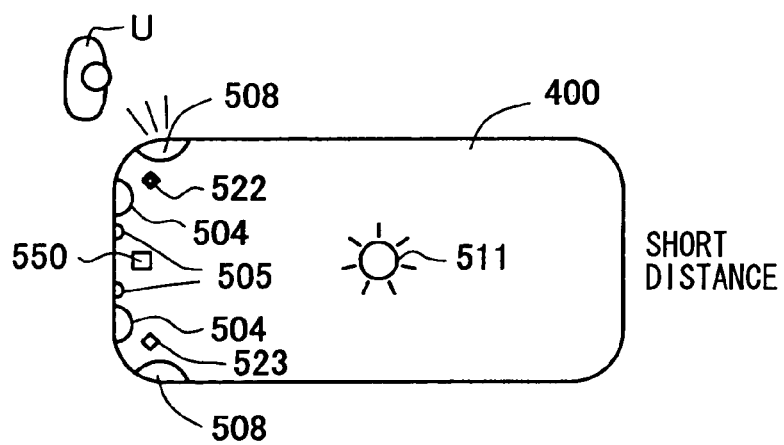
FIG. 12D — SHORT DISTANCE

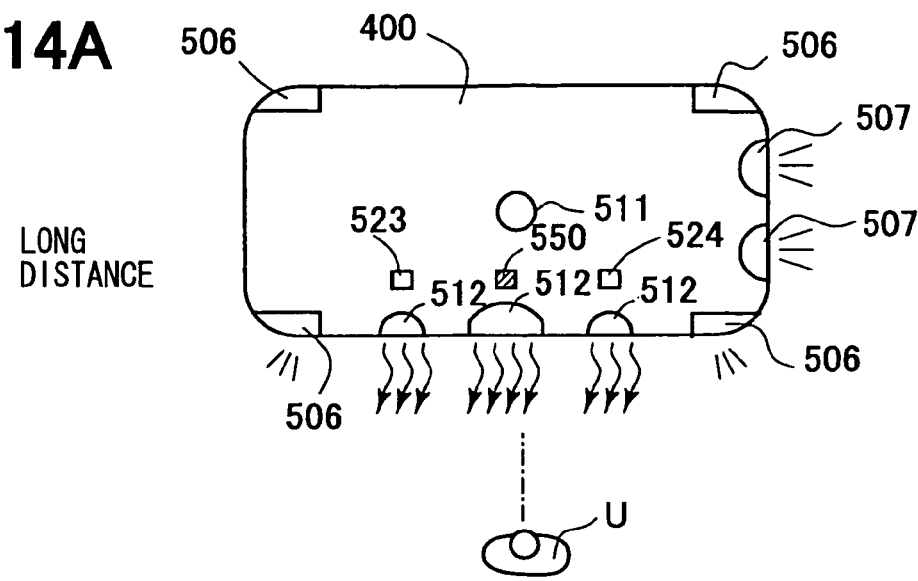
FIG. 14A  LONG DISTANCE
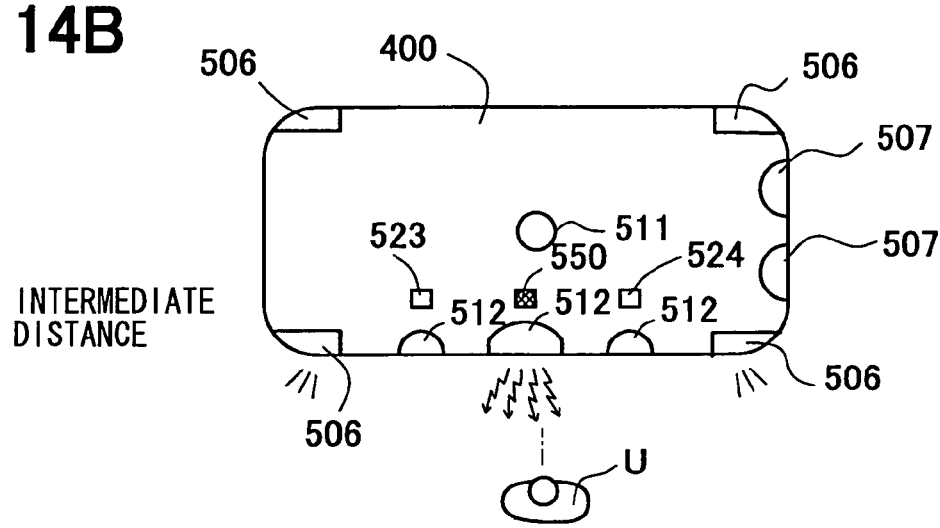
FIG. 14B  INTERMEDIATE DISTANCE
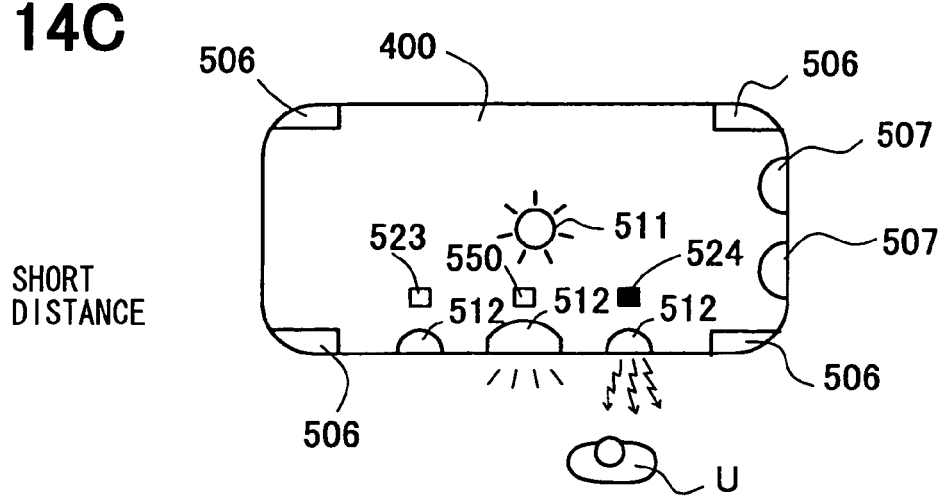
FIG. 14C  SHORT DISTANCE

LONG DISTANCE

INTERMEDIATE DISTANCE

SHORT DISTANCE

SHORT DISTANCE

AIR CONDUCTION
SOUND SPECTRUM

BONE CONDUCTION
SOUND SPECTRUM

DIFFERENTIAL
SPECTRUM

USER WELCOMING SYSTEM FOR AN AUTOMOBILE

CROSS REFERENCE TO RELATED APPLICATION

This application is based on Japanese Patent Application No. 2004-253024, which is filed on Aug. 31, 2004, the disclosure of which is incorporated herein by reference.

FIELD OF THE INVENTION

The present invention relates to a system for welcoming an automobile user by executing a welcoming operation when the user approaches and gets into the automobile. The welcoming operation includes such operations of guiding the user to the automobile, assisting the user in getting into the automobile, or providing other services to the user getting into or having got into the automobile.

BACKGROUND OF THE INVENTION

An automatic adjusting device, which controls car-mounted equipment by utilizing a cellular phone, is disclosed in an Unexamined Japanese Patent Publication No. 2003-312391. The device communicates with the cellular phones, which is owned by a user of an automobile, by means of a wireless communication device installed in the automobile. In addition, the automatic adjusting device controls operations of the car-mounted equipment, such as an air-conditioner, a car stereo, optical axes of head lamps, electrically-driven seats, and electrically-driven mirrors, according to preset conditions for respective users. The publication also discloses an art, in which the device detects the number and the positions of the users by means of a GPS (Global Positioning System) receiver of the cellular phone and accordingly adjusts a balance of sound volume or frequency characteristics.

However, the above device controls the on-board equipment only after the users have got into the automobile. The publication does not disclose an art to control the on-board equipment before the users get into the automobile. This is obvious from the fact that the publication discloses a short distance wireless communication device, specifically a Bluetooth terminal, as a on-board communication device and FIG. 1 of the publication shows that the Bluetooth terminal communicates only with the cellular phones in the automobile. According to the specification of Bluetooth, a Bluetooth terminal can communicate with other terminals at a distance within 10 meters at most.

It can be generally said, apart from the publication, that car-mounted devices, such as lamps, a horn and the like are not sufficiently used to assist a user approaching to the parking automobile, though they are potentially capable of doing that. For example, wireless key entry systems are widely used, in which the systems remotely operate lock/unlock of the automobile, and the lighting devices such as hazard lamps are turned on in a predetermined pattern to notify the user of the acceptation of the operation. In addition, such a function is realized, in which a room lamp is turned on when the wireless key is operated, in order to assist the user in getting into the automobile in the night. However, since the systems are operated with direct and one-way transmission of radio waves from the user to the automobile, a reaching area of the radio waves is small (several meters at longest). Therefore, the systems are not useful to assist the user in finding the automobile beyond the reaching area of the radio waves or to assist the user in approaching from a distance to the parking automobile.

SUMMARY OF THE INVENTION

The present invention is made in view of the above problems. Thus, it is an object of the present invention to provide a system for welcoming an automobile user, which executes a highly detailed welcoming operation for the user approaching to a parking automobile, wherein the user is guided to the automobile, or assisted in getting into the automobile, or other services are provided to the user, who is getting into or has already got into the automobile.

According to a feature of the present invention, a welcoming system for a user of an automobile comprises a host communication means provided in the automobile or at a facility around a parking location of the automobile. The system further comprises a user terminal carried by the user of the automobile, so that the user communicates with the host communication means via wireless communicating network. A distance detecting means is provided in the automobile for detecting a distance between the user and the parking automobile. A welcoming control means as well as a welcoming operating means is provided either in the automobile or the facility around the parking automobile, and the welcoming control means operates the welcoming operating means, in such a manner that the welcoming control means selects and changes a content of the welcoming operations depending on the detected distance between the user and the automobile.

The welcoming operations comprise an operation of guiding the user toward the parking location of the automobile, an operation of assisting the user in getting into the automobile, and an operation of providing various services to the user before and/or after the user gets into the automobile.

According to another feature of the present invention, the welcoming control means terminates one of the welcoming operations which is already in its operation, or starts another welcoming operation which is not yet in its operation, depending on the detected distance between the user and the automobile. As above, the welcoming control means changes the welcoming operations in a stepwise manner. In the case that a predetermined distance between the user and the automobile is decided, the content of the welcoming operations can be changed when the actual (detected) distance becomes smaller than the predetermined distance. In such an arrangement, a load to the welcoming control means for performing necessary calculations and processes can be designed to be smaller.

According to a further feature of the present invention, a lighting device provided at the facility around the parking automobile can be also used as one of the welcoming operating means, in addition to various lamps provided in the automobile. The lighting device of the facility is operated to light up the automobile to show its location to the user, and/or to guide the user toward the automobile, in particular in the night.

According to a still further feature of the present invention, the welcoming control means operates the lighting device of the automobile, such as the head lamp, the room lamp, and so on, wherein the total intensity of the light is decreased in accordance with a decrease of the detected distance between the user and the automobile. As a result, energy consumption for the lighting device can be reduced.

According to a still further feature of the present invention, multiple direction detecting means are provided in the automobile for detecting a relative approaching direction of the user with respect to the automobile. The welcoming control means operates one of the lighting devices of the automobile, which is provided at the relative approaching direction, to provide a more comfortable service to the user.

According to a still further feature of the present invention, the welcoming control means starts one of the welcoming operations, when the detected distance between the user and the automobile becomes smaller than a first predetermined distance. The first predetermined distance is preferably selected from a range of 100 to 400 m. As a result, the welcoming system of the present invention can provide the user with information of a parking location of the automobile, even when the user is separated from the automobile with a relatively long distance, in particular in the case that the user has parked his automobile in a large parking lot and forgets its parking position.

The welcoming operations can be made by lighting the head lamps and/or sounding the horn.

In the case that a combination of the lighting manners for the head lamps (or any other lamps) and/or of the sounding manners for the horn is decided in advance as a specific pattern for the user, it becomes much easier for the user to find out his automobile.

It is also effective to make a display of the user terminal to show the information of the parking position (including the direction to the automobile, a level of the parking location in a multi-level parking lot).

According to a still further feature of the present invention, the welcoming control means starts a further one of the welcoming operations, when the detected distance between the user and the automobile becomes smaller than a second predetermined distance, which is smaller than the first predetermined distance. The second predetermined distance is preferably selected from a range of 3 to 50 m.

Any kinds of the lighting devices (such as, the head lamps, fog lamps, tail lamps, room lamps, and so on) provided in the automobile can be used as the welcoming operating means.

According to a still further feature of the present invention, the welcoming operating means comprises an air conditioning apparatus mounted in the automobile, wherein the welcoming control means starts an operation of the air conditioning apparatus, upon receiving a command signal from the user terminal, before the user approaches to the automobile. As a result, the inside (room) temperature of the automobile can be controlled at a desired value when the user gets into the automobile.

According to a still further feature of the present invention, the welcoming operating means comprises a music stereo device provided in the automobile, wherein the welcoming control means starts an operation of the music stereo device, so that a pre-selected music is played when the user is getting into the automobile.

According to a still further feature of the present invention, the welcoming control means starts an operation of the welcoming operating means upon receiving a command signal from the user terminal.

According to a still further feature of the present invention, the user terminal comprises an authenticating means for authenticating the user, and the command signal is transmitted to the host communication means, only when the authentication is correctly completed. According to such an arrangement, a possible theft of the automobile can be effectively prevented, even in the case that the user had lost its user terminal.

BRIEF DESCRIPTION OF THE DRAWINGS

The above and other objects, features and advantages of the present invention will become more apparent from the following detailed description made with reference to the accompanying drawings. In the drawings:

FIGS. 12A to 12D are schematic views showing an example of welcoming operations;

FIGS. 14A to 14C are schematic views also showing a further example of the welcoming operations;

DETAILED DESCRIPTION OF THE PREFERRED EMBODIMENTS

Figure 1:
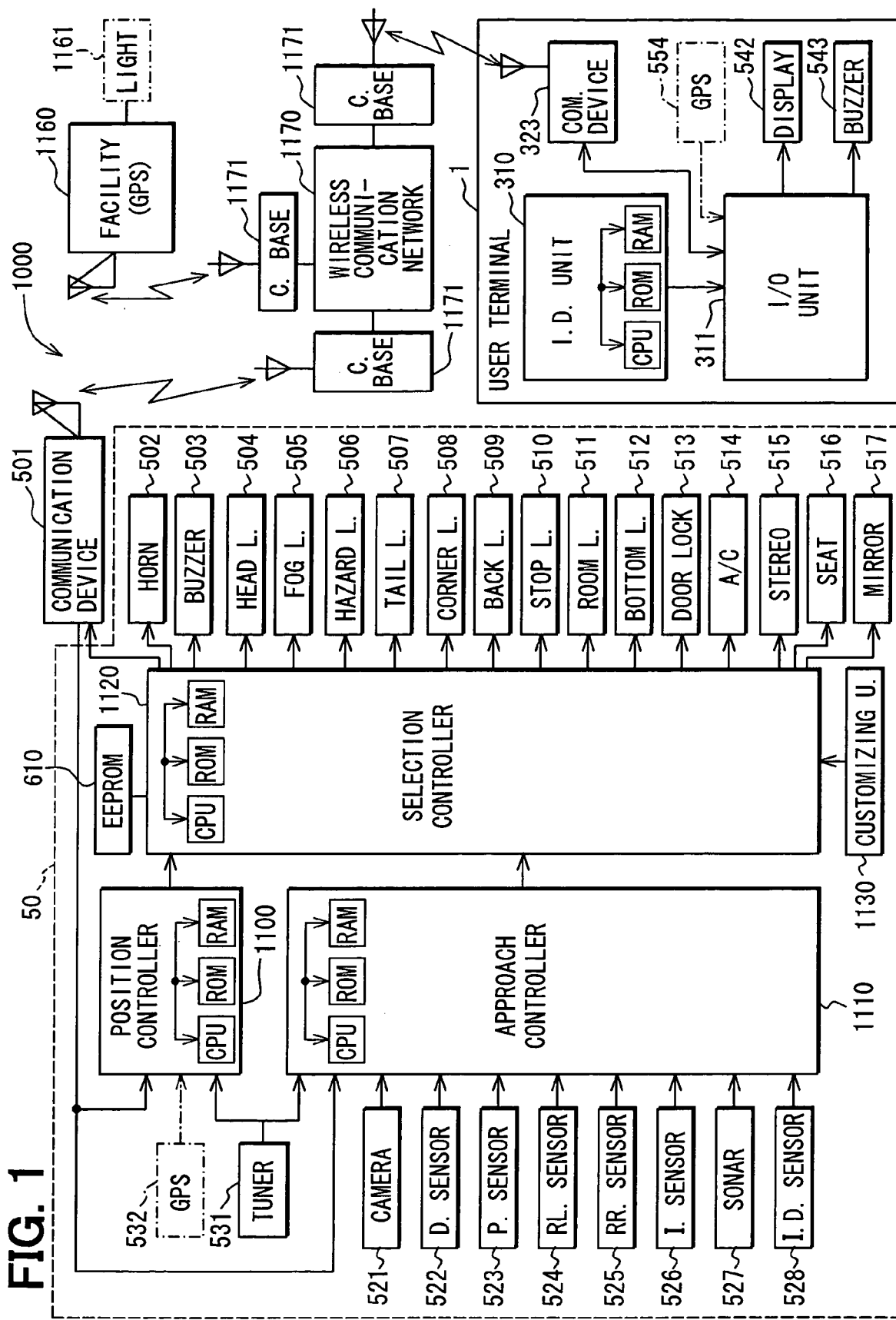
FIG. 1 is a block diagram showing electrical configurations of a user welcoming system for an automobile according to the present invention.

A first embodiment of the present invention will be described below with reference to the accompanying drawings. FIG. 1 shows a schematic block diagram of a user welcoming system 1000 for an automobile. The system 1000 has a wireless communication device 501, a user terminal 1, and a welcoming controller 50. The communication device 501 is provided in the automobile and acts as a host communication means. The user terminal 1 is brought along by a user of the automobile and has a communication device 323 which acts as a terminal communication means by communicating with the host communication means through a wireless communication network 1170. The welcoming controller 50 is installed in the automobile and activates welcoming actuators 502-517 and 1161 when it receives an activation command from the user terminal 1 through the communication devices 501 and 323. The welcoming actuators 502-517 are installed in the automobile and the welcoming actuator 1161 is installed in a facility around the automobile, such as a building.

The welcoming controller 50 has mainly an automobile position determination controller (hereafter a position controller) 1100, a user approaching determination controller (hereafter an approach controller) 1110, and a function selection controller (hereafter a selection controller) 1120. Each of the controllers 1100, 1110 and 1120 includes a microprocessor with a CPU, a ROM, and a RAM. The ROM stores programs for carrying out functions which will be described in detail below, and the RAM functions as a working area in executing the programs. The position controller 1100 is connected with the communication device 501, a wireless tuner 531, and a GPS receiver 532. The signals which are received by the communication device 501 are also inputted into the position controller 1110.

The user terminal 1 is a cellular phone in the embodiment. As shown in FIG. 1, the cellular phone has an information determination unit 310, an input/output unit 311, a display 542, and a sound generator 543. The information determination unit 310 includes a microprocessor. The input/output unit 311 is connected with the information determination unit 310. The display 542 and sound generator 543 are connected with the input/output unit 311. The display 542 includes a liquid crystal panel. The sound generator 543 is a buzzer in the embodiment, but can be a ring alert generator as well.

The position controller 1100 receives location information of the parking automobile through the network 1170 from the GPS receiver, which is installed in a facility 1160 around a parking place of the automobile. The facility can be, for example, a house of the user or a garage. The position controller 1100 may autonomously obtain the location information of the automobile from the GPS receiver 532, which is connected with the position controller 1100. As a structure of the GPS receiver is well known, its detailed description is omitted here.

The location information is used to specify the distance between the user terminal 1 and the automobile, and the direction of the user approaching to the automobile. The user terminal 1 establishes a connection with the network 1170 through a closest wireless base station 1171, and the base station 1171 adds location information thereof to communication data received from the user terminal 1 and transfers the resultant data to the position controller 1100. Thus, the position controller 1100 is able to determine the distance and the direction to the user, by using the location information of the automobile from the GPS receiver 532 or the GPS receiver in the facility 1160 as well as the location information of the closest base station 1171 being connected with the user terminal 1.

However, in order to determine the distance and the direction more precisely, it is preferable that a GPS receiver 554 is provided in the user terminal 1, so that the user terminal 1 autonomously obtains location information thereof, and sends the obtained location information to the position controller 1100 through the network 1170. In this case, the position controller 1100 is capable of obtaining precise location information of the automobile from both the GPS receiver 532 provided in the position controller 1100 and the GPS receiver 554 provided in the user terminal 1, and therefore accurately determines the distance and the direction. Moreover, since the position controller 1100 can determine changes of the distance and the direction virtually in real time, the welcoming controller 50 can control the lighting devices 504-512 and the sound generators 502 and 503 more sensitively.

The location information respectively obtained by the GPS receiver 532 in the automobile and the GPS receiver 554 in the user terminal is useful to comprehend the distance and the relative direction, in particular when-the distance between the user terminal 1 and the automobile is relatively long. For example, the location information from the GPS receivers 532 and 554 can be effectively used in notifying the parking location to the user by means of the lighting devices 504-512 and/or the sound generators 502 and 503, when the user forgets the parking location of the automobile but comes closer to an area of the parking location (e.g. within a range from 100 to 400 meters). The position controller 1100 may, alternatively, send the parking location of the automobile to the user terminal 1, so that an assisting information for the parking location may be displayed in the display portion 542, wherein the assisting information can be a map including the locations of the user terminal 1 and the automobile, or indication of the distance and the direction to the automobile.

The approach controller 1110 is connected with various sensors for precisely detecting the relative position of the user to the automobile, when the user with the user terminal 1 comes much closer to the automobile. The sensors mainly include human sensors 522-525 arranged at each seat for detecting a target seat, to which the user is approaching. In FIG. 1 the human sensors include a sensor at the driver's seat 522, a sensor at the passenger's seat 523, a sensor at the rear-left seat 524, and a sensor at the rear-right seat 525. The human sensors may include more sensors as shown in FIGS. 12-16. The sensors also include a camera 521, an infrared sensor 526, a sonar sensor 527, and an intrusion detecting sensor 528 for the purpose of monitoring the interior of the automobile for security.

The selection controller 1120 is connected with the sound generators which include a horn 502 and a buzzer 503. The selection controller 1120 is also connected with the lighting devices which include head lamps 504, fog lamps 505, hazard lamps 506, tail lamps 507, cornering lamps 508, backup lamps 509, stop lamps 510, room lamps 511, and bottom lamps 512. These sound generators and lighting devices form as a part of welcoming actuators and are controlled according to operating patterns described by a controlling program stored in the ROM of the selection controller 1120. The operating patterns can be changed in various ways by making a customizing unit 1130 modify the controlling program.

The selection controller 1120 is further connected with other welcoming actuators, such as an air conditioner 514, a car stereo 515, electrically-driven seats 516, and an actuator 517 for angle control of the side mirrors and the back mirror. A facility light 1161 is also provided at the facility 1160 around the parking automobile and formed as a part of the welcoming actuators, which is operated by the wireless communication with the user terminal 1.

Figure 2:
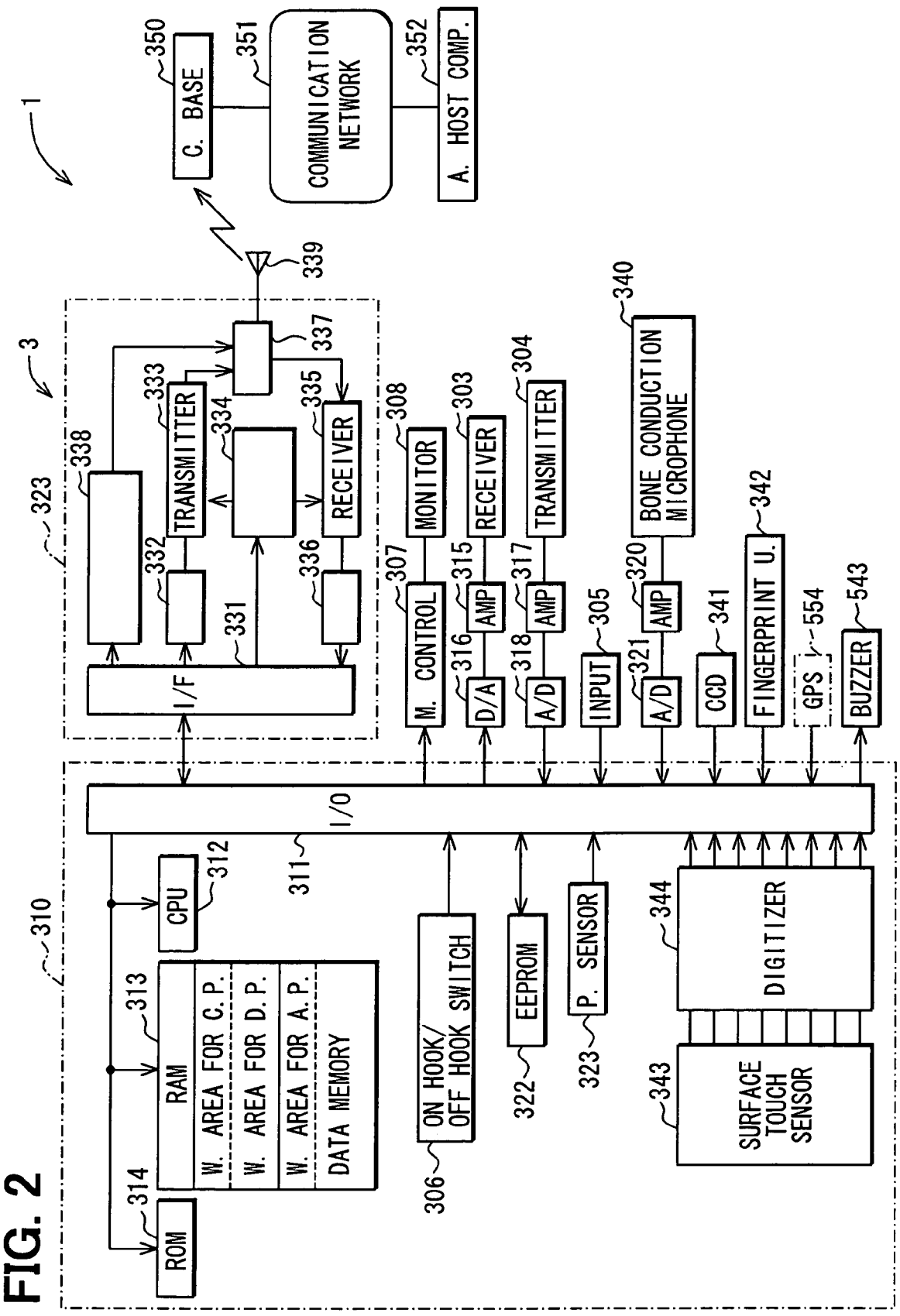
FIG. 2 is a block diagram showing electrical configurations of a user terminal.

FIG. 2 is a block diagram showing electrical connections of the user terminal 1. The user terminal 1 mainly comprises the information determination unit 310 which includes the input/output 311, a CPU 312, a RAM 313, a ROM 314, and an EEPROM (Electrically Erasable Programmable Read Only Memory) 322. The CPU 312, the RAM 313, the RAM 314, and the EEPROM 322 are connected with the input/output unit 311. The CPU 312 acts as a control means for obtaining information of authentication attributes, an authentication means, and a means for calculating information of complex voice attributes. The RAM 313 comprises a memory for storing a bone conduction sound information and a memory for storing an air conduction sound information. The input/output unit 311 is connected with an inputting unit 305 and an on hook/off hook selector switch 306. A receiver 303 is connected with the input/output unit 311 through an amplifier 315 and a D/A converter 316. A voice transmitter 304 is connected with the input/output unit 311 through an amplifier 317 and an A/D converter 318. A bone conduction microphone 340 is connected with the input/output unit 311 through an amplifier 320 and an A/D converter 321. The input/output unit 311 is also connected with the GPS receiver 554 and the sound-outputting unit 543, that is, the buzzer or the ring alert generator.

The voice transmitter 304 has a microphone which also operates as an air conduction sound detector. The receiver 303 has a bone conduction speaker, which is located near a bone conduction microphone 340 operating as a bone conduction sound detector. A basic structure of the bone conduction speaker is well known in the art, as disclosed in Japanese Patent No. 2967777 and Unexamined Japanese Patent Publication No. 2003-340370, and a basic structure of the bone conduction microphone is well known in the art, as disclosed in Unexamined Japanese Utility Model Publication No. S55-146785, Unexamined Japanese Patent Publication No. S58-182397, Unexamined Japanese Utility model Publication No. S63-173991, or Japanese Patent No. 3488749. They are put on an ear or a jaw bone during use. They act as a unit for obtaining information of authentication attributes.

Figure 3:
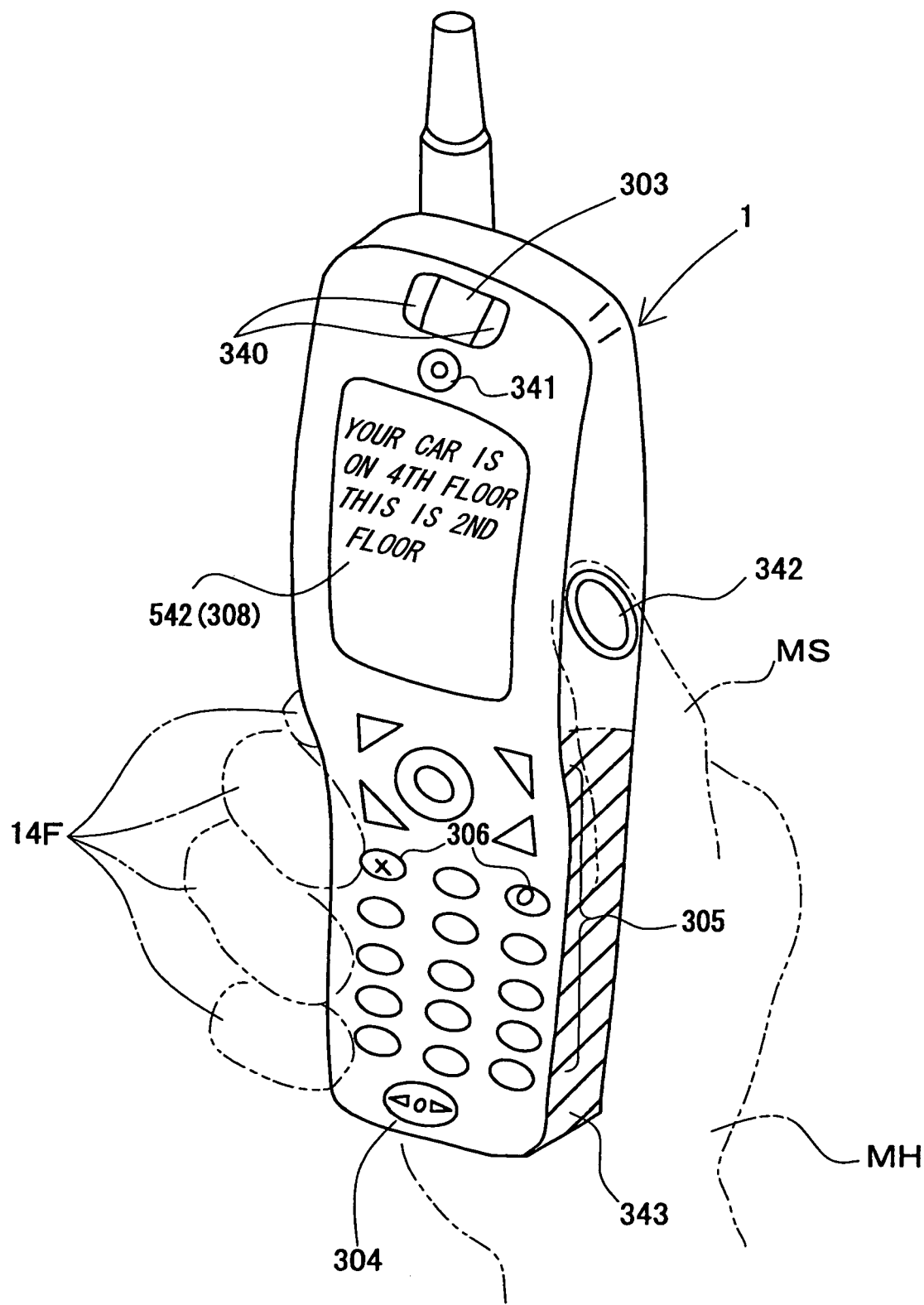
FIG. 3 is a perspective view of a cellular phone which is used as the user terminal of the present invention.

The cellular phone 1 has another unit for obtaining the information of the authentication attributes, which comprises a face camera 341, a fingerprint detector 342, and a surface touch sensor 343. The surface touch sensor 343 is a contact type biometric attribute detector ways of gripping the cellular phone 1 are basically the same, among individuals, except for slight differences. FIG. 3 shows a typical way of gripping the cellular phone 1, in which the lower part of the cellular phone 1 is put on the bottom side of the palm in order to make the display 542 face inward of a hand MH. More specifically, the four fingers 14F are bent to touch the first side face of the cellular phone 1, wherein the first side face is the left side face if the hand MH is a right hand or it is the opposite side face if the hand MH is a left hand. Moreover, the root and a side face of the thumb MS are put along a lower half of the second side face of the cellular phone 1, wherein the second side face is the right side face if the hand MH is a right hand or it is the opposite side face if the hand MH is a left hand. And the tip of the thumb MF is put on a portion of the upper half of the second side face. The user generally grips the cellular phone 1 in the above manner automatically to avoid that the fingers may improperly touch the inputting unit 305, and to relieve the user from discomfort feelings caused by the fingertips touching the face. According to the embodiment, the fingerprint detector 342 is located at the position, which a forward inner surface of the thumb touches, and the surface touch sensors 343 are provided at both side surfaces of the cellular phone 1.

Figure 4:
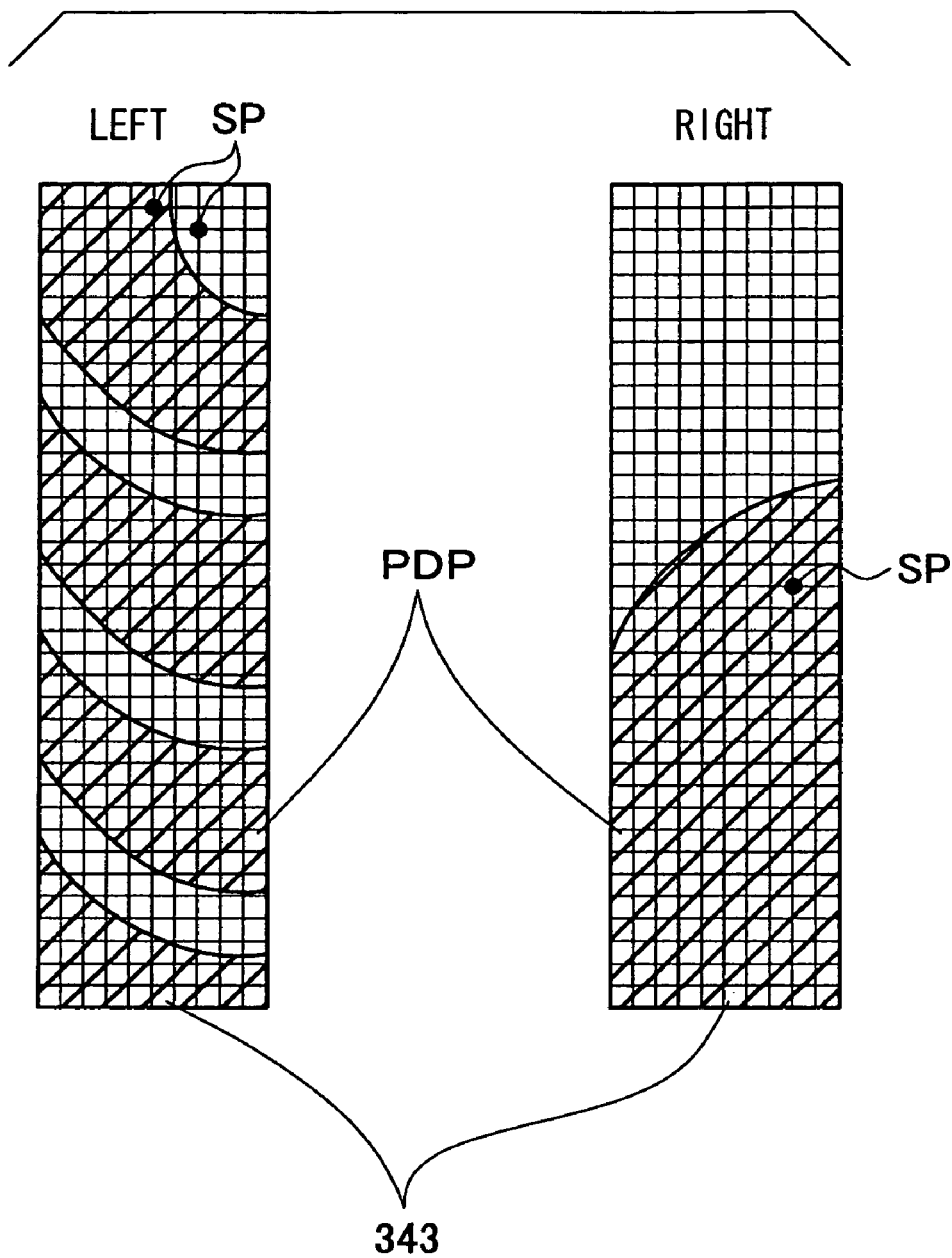
FIG. 4 is schematic view showing pressure distributions detected by a surface touch sensor.

In this embodiment, as shown in FIG. 4, sheet-like pressure sensor modules are used as the surface touch sensor 343. Each module has a sheet and multiple pressure sensing contacts SP which vary their contact resistances (or contact capacity) depending on applied pressures. The resistance (detected pressure value) of each pressure sensing contact is converted to a discrete value expressed by a digital signal including a plurality of bits. The discrete values show information on distribution of the pressure. Thus, the sensor module at the first side face (the left side in FIG. 3) of the cellular phone 1 detects pressure sensed areas PDP which correspond to areas pressed by the four fingers other than the thumb. And the sensor module at the second side face (the right side in FIG. 3) detects a pressure-sensed area PDP which corresponds to an area pressed by the thumb and the root thereof. They can be used as individual attributing information, because the shapes of the PDP vary depending on the individuals.

The face camera 341 has, for example, a CCD camera and is located closely to the display 542 of the cellular phone 1 in order that the camera 341 can take a picture of a face for authentication when the face of the user faces the display 542. This location of the camera 341 comes from the requirement that a face image for authentication must be taken in such a manner that required portions of the face are kept in the scope of the camera 341. For that purpose, a view finder image taken by the camera 341 is displayed in the display 542, so that the image by the face can be taken in a suitable orientation for the authentication. For example, the images are taken in the suitable orientation, if the face is within a reference frame shown in the display 542 and the eyes in the face are on a reference line therein.

The face camera 341 may be replaced by a retina camera and an image of a retina taken by the camera can be used as the information of authentication attributes. Furthermore, an image of an iris may be likewise used as the information of authentication attributes. In case of using the images of the irises, verification and authentication are made according to the individual's characteristics in the colors and patterns of the irises. Especially, patterns of the irises are acquired characteristics and hardly depend on generic nature. There is a big difference in the patterns of the irises even between identical twins. Thus, the images of the irises can be used for strict identification. By using the patterns of the irises, verification and authentication can be quickly done with little possibility of misidentification ordinary cameras are capable of taking the images of the irises. Cameras other than the face camera 341 may be used only for taking the images of the irises. The images of the irises may be taken by the face camera 341 with an attachment for the irises.

As shown in FIG. 2, the input/output unit 311 is connected with the communication device 323. The communication device 323 has an interface 331, a modulator 332, a transmitter 333, a frequency synthesizer 334, a receiver 335, a demodulator 336, a duplexer 337, and a controlling wave transmitter 338. The interface 331 is used to establish a connection with the information determination unit 310. The modulator 332 is connected with the interface 331. The modulator modulates data signals from the unit 310 and the transmitter 333 transmits the resultant signals through the duplexer 337 and the antenna 339. The receiver 335 receives radio waves through the antenna 339 and the duplexer 337, the demodulator 336 demodulates the received signals, and input/output unit 311 of the unit 310 receives the resultant signals. During a telephone call, the amplifier 317 amplifies voice signals from the voice transmitter 304, the A/D converter 318 converts the amplified signals into digital signals, and the unit 310 receives the resultant signals. The unit 310 modifies the received signals according to need and the receiver 303 receives the resultant signals through the D/A converter 316 and the amplifier 315, and outputs the received signals.

The controlling wave transmitter 338 is connected with the interface 331. The antenna 339 receives controlling waves from the transmitter 338 through the duplexer 337 and transmits the waves in accordance with the controlling waves. When the cellular phone 1 is moved from one communication zone to another communication zone, a wireless control station at the network executes a well known handover process according to the status about the reception of the controlling waves "P".

Figure 5:
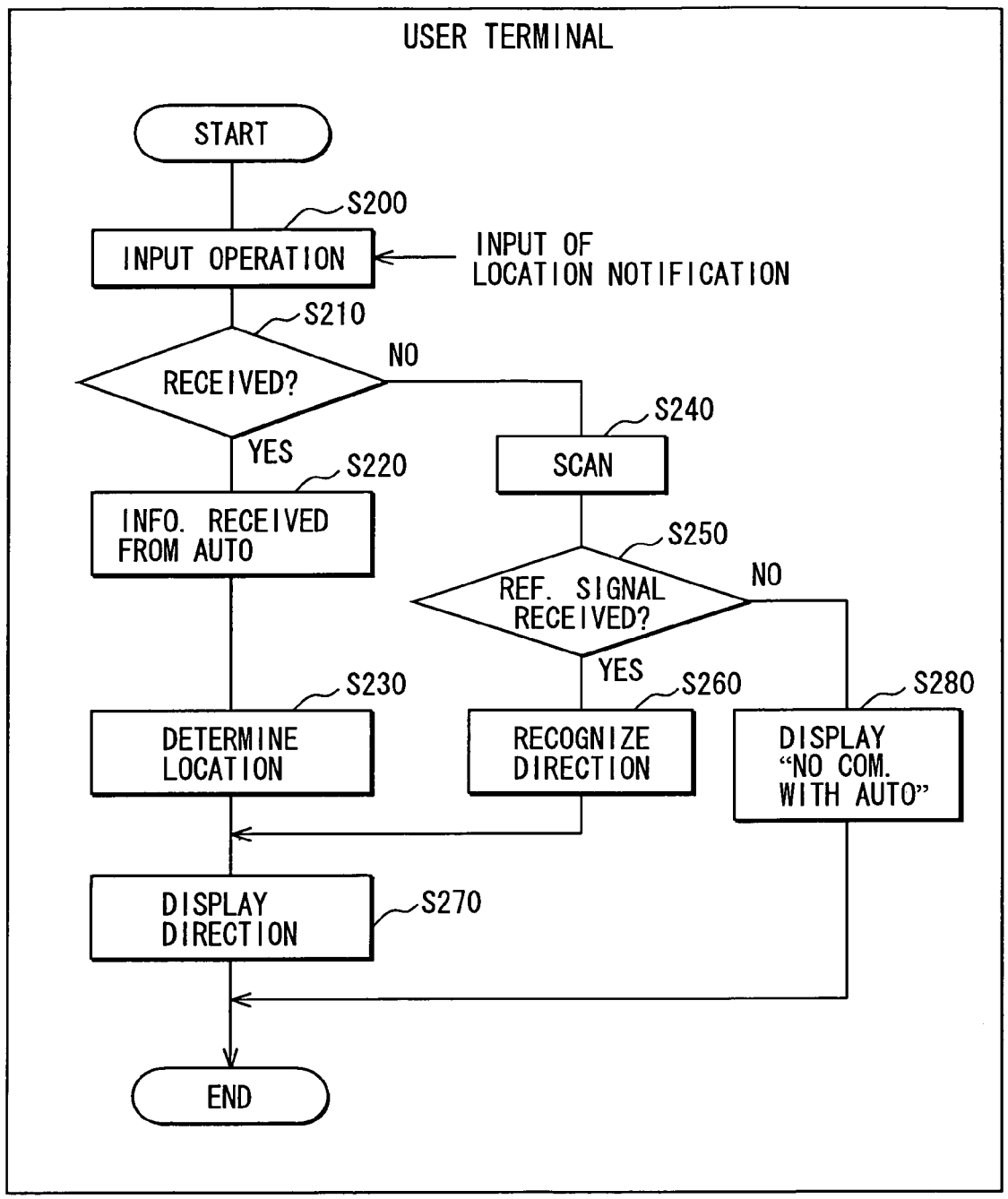
FIG. 5 is a flowchart of processes to be performed by the user terminal.

An operation of the user welcoming system for an automobile 1000 will be described. FIG. 5 shows a flowchart for processes of the user terminal 1. At a step S200, the user terminal 1 executes an authentication process, in which it determines whether the operator of the user terminal 1 is a user of the automobile. The authentication process will be described later in detail. When the operator (user) forgets the parking location of the automobile, the operator inputs a request for notification of the parking location through the inputting unit 305 (FIG. 3) after the authentication process has been completed. The inputted request is converted to an activation command by the information determination unit 310, and the communication device 323 sends the activation command to the welcoming controller 50 through the network 1170 (FIG. 1).

At a step S210, the user terminal 1 determines whether it is able to receive parking location data from the welcoming controller 50. If it is the case, the user terminal 1 obtains the parking location data at a step S220, and specifies at a step S230 the relative position of the automobile to the user terminal 1 based on the obtained data at the step S220. The specified relative position includes the distance between the automobile and the user terminal 1 and the direction of the automobile when viewed from the user terminal 1. The user terminal 1 further makes the display 542 show information on the specified relative position at a step S270.

According to the processes in FIG. 5, the user terminal 1 utilizes multiple wave sources from the automobile. When it is unable to obtain the parking location data from one of the wave sources, the user terminal 1 executes steps S240, S250, S260 and S280 to obtain the parking location information by utilizing another wave source, as an alternative method. However, as shown in FIG. 1, wherein the automobile and the user terminal 1 respectively have the GPS receivers 532 and 554, and the user terminal 1 and the automobile exchange the location information of the GPS receivers, the user terminal 1 can obtain the location information from both of them without difficulty and may omit executing those steps. In the case that the user terminal 1 executes those steps, namely if it cannot receive the parking location information from the welcoming controller 50 at the step S210, then the process goes to a step S240 so that the user terminal 1 makes an attempt to receive radio waves from a wireless tuner 531 (FIG. 1) provided in the automobile by scanning in a direction, from which the waves come. At the step S250, the user terminal 1 determines, according to the result of the scanning, whether it is able to receive reference signal generated at the automobile, which is described later. If it is not the case, then the user terminal 1 executes the step S280 and determines that there is no automobile which can communicate with the user terminal 1 and makes the display 542 indicate accordingly. If it is able to receive the reference signal, then the user terminal 1 determines the direction of the automobile according to the intensity of the wave or the like at the step S260, and makes the display 542 indicate accordingly.

Figure 6:
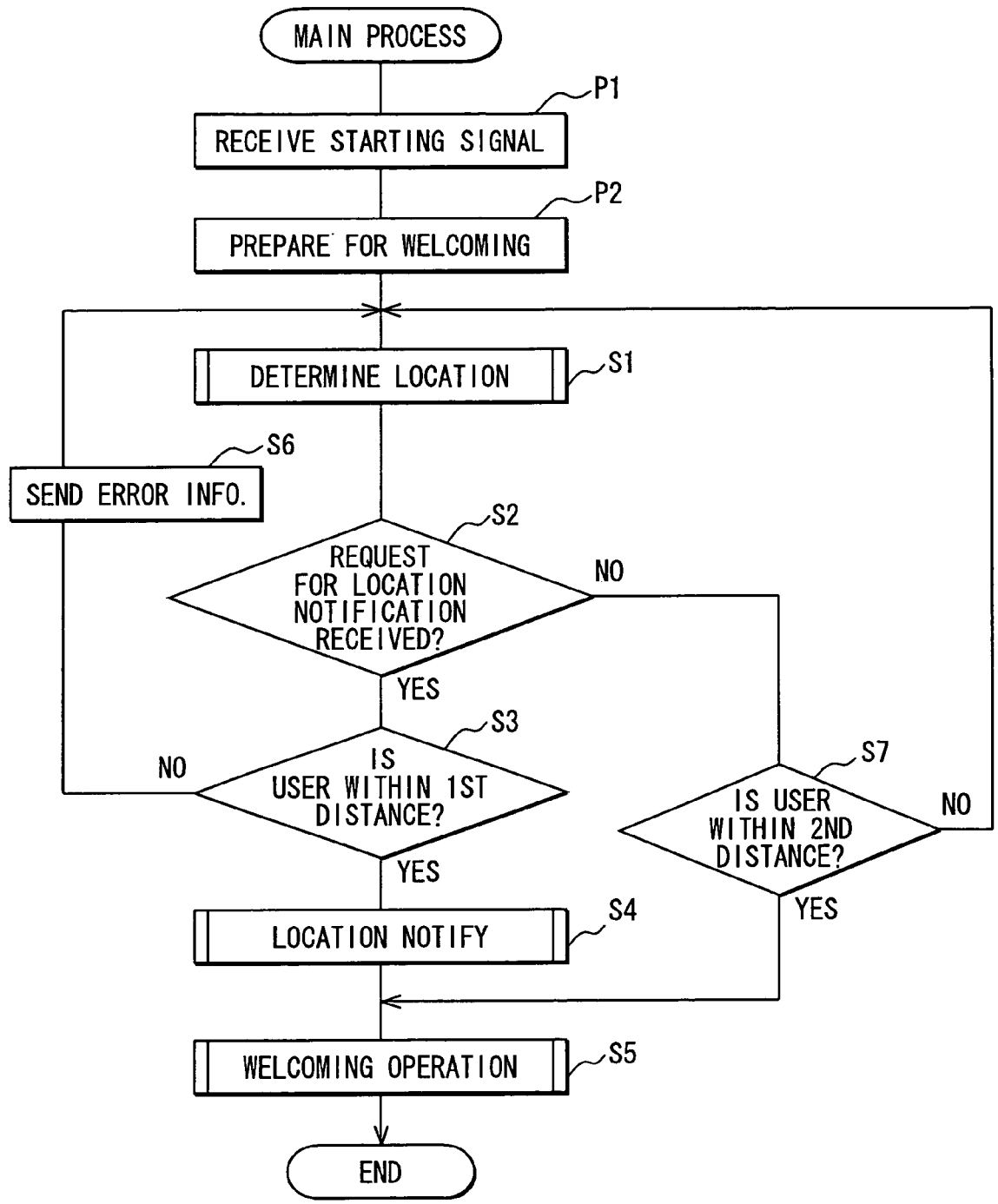
FIG. 6 is a main flowchart of processes to be performed by a welcoming controller.

FIG. 6 shows a flowchart of main processes performed by the welcoming controller. At a step P1, the controller 50 starts its processes upon receiving the activation command from the user terminal 1. At a step P2, the controller 50 executes a process to prepare welcoming operations. In this process, the controller 50 starts an operation of the air conditioner 514 to adjust the inside temperature of the automobile. In this process, the user terminal 1 may transmit a command signal for setting the inside temperature. In this case, the controller 50 receives the command signal and stores the same in a memory device 610 (EEPROM 610 in the embodiment). Then the welcoming controller 50 controls the operation of the air conditioner 514 according to the command signal for the temperature setting.

In a situation where the inside temperature has become extremely high in summer, or in extremely cold weather, it takes a long time until the inside temperature reaches to a target temperature. In these cases, the user terminal 1 may adjust a timing to transmit an activation command according to a timing of the user's operation. The welcoming controller 50 may alternatively activate the air conditioner 514 with its timer operation. In this case, the user terminal 1 may transmit timing information as well as the temperature setting. The welcoming controller 50 stores the transmitted information in the memory device 610, and activates the air conditioner 514 at a time which is based on the information. The timing information may include a time point for starting the operation of the air conditioner 514, or a time point at which the inside temperature reaches to the target temperature. In the latter case, the welcoming controller 50 detects a current room (inside) temperature by means of a temperature sensor, calculates a period during which the room temperature reaches to the target temperature, and starts the operation of the air conditioner 514 at an advanced time of the period before the designated time.

At a step S1, the welcoming controller 50 determines the current position of the automobile, and at a step S2, the welcoming controller 50 makes a decision whether it received a signal requesting for notification of the parking location (i.e. activation command) from the user terminal 1. If the decision is YES, the welcoming controller 50 calculates the distance between the automobile and the user (the user terminal 1) at a step S3. If the calculated distance is shorter than a first predetermined distance, then the process goes to a step S4, at which the welcoming controller 50 executes the position notification. The first predetermined distance may be, for example, a constant value within a range from 100 meters to 400 meters. If the calculated distance is longer than the first predetermined distance, then the process goes to the step S1 and the above process will be repeated. At a step S6, the welcoming controller 50 may return error information to the user terminal 1 which tells that the automobile is not within the first predetermined distance. The user terminal 1 may make the display 542 to show a message according to the error information.

In the case that the decision at the step S2 is NO, then the process goes to a step S7. At the step S7, if the calculated distance is shorter than a second predetermined distance, then the process goes to a step S5 to execute the welcoming operations. The second predetermined distance is shorter than the first predetermined distance, and may be, for example, a constant value within a range from 3 meters to 50 meters. If the calculated distance is longer than the second predetermined distance, then the process goes back to the step S1 and the above process will be repeated.

Figure 7:
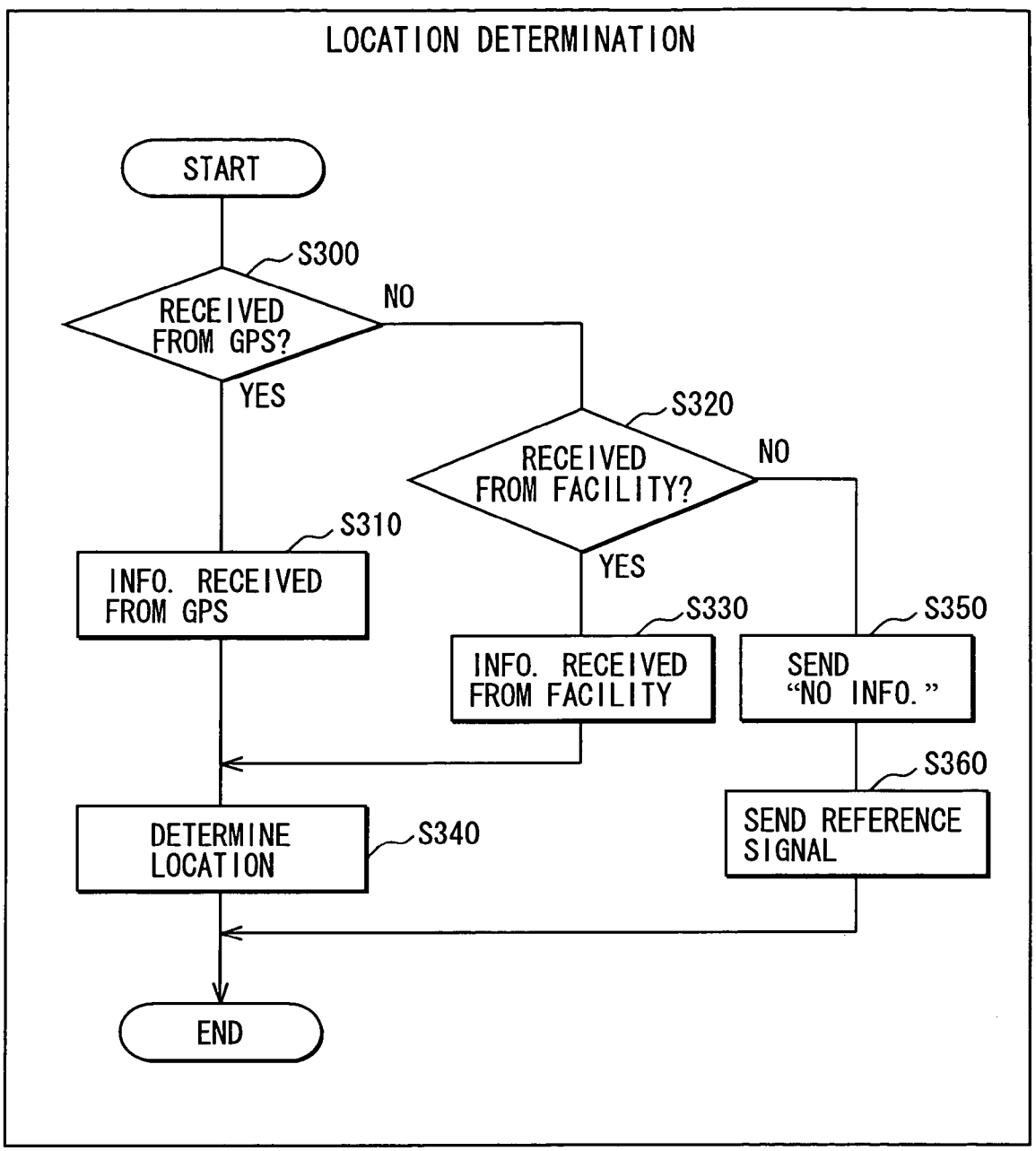
FIG. 7 is a flowchart for a position determination process in FIG. 6.

FIG. 7 shows a flowchart of the processes for the position determination of the step S1 of FIG. 6. At a step S300, the welcoming controller 50 makes a decision whether it is able to receive location information from the GPS receiver 532. If the decision is YES, then the welcoming controller 50 proceeds to a step S310 to receive the location information and determine the current absolute position of the automobile. The determined absolute position is defined by, for example, latitude and longitude. The determined absolute position can be also defined in combination with well known map data. Specifically, the determined absolute position is defined as a position in the map data. On the other hand, if the decision at the step S300 is NO, then the welcoming controller proceeds to a step S320 and makes a decision whether it is able to receive current location information from another GPS receiver other than the GPS receiver 532, such as the GPS receiver installed in the facility 1160 shown in FIG. 1. If the decision is YES, then it proceeds to a step S330 and receives the current location information from the other GPS receiver, and at a step S340, it determines the current location of the automobile. If the decision at the step 320 is NO, then it proceeds to a step S350 and notifies the user terminal 1 that there is no location information available. Moreover, it transmits a reference signal as the final resort at a step S360. Then the user terminal 1 tries to determine the relative position to the automobile according to the reference signal.

Figure 8:
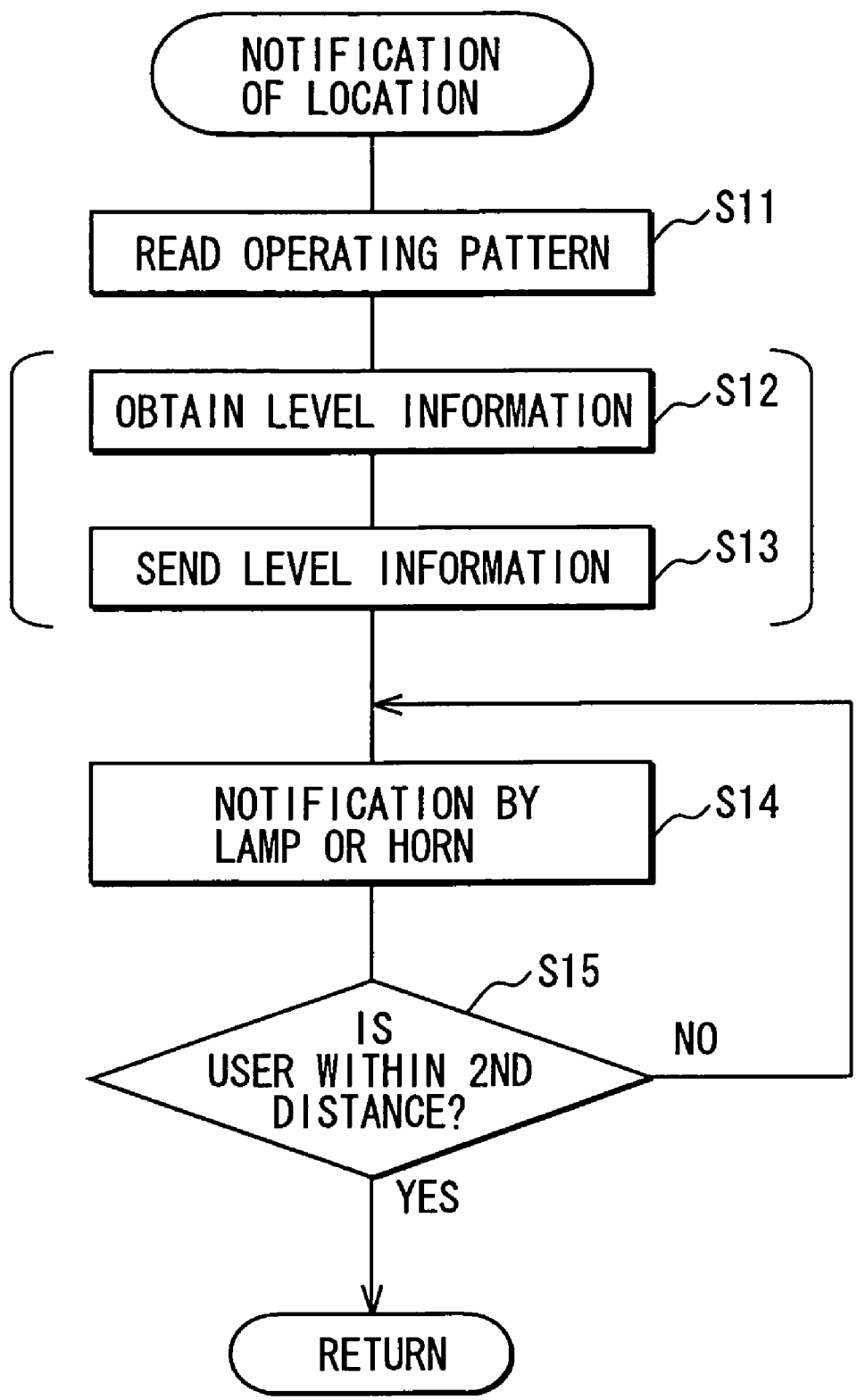
FIG. 8 is a flowchart for a position notification process in FIG. 6.

FIG. 8 shows a flowchart of the processes for the position notification of the step S4 of FIG. 6. In the embodiment, the welcoming controller 50 notifies the user of the parking location of the automobile by using the lighting devices and the sound generators in combination. In addition, the welcoming controller 50 can determine a set of output patterns for notification depending on the predetermined settings. This will make the output patterns more discriminative among automobiles. Firstly at a step S11, the welcoming controller 50 retrieves a preferred set of output pattern among a plurality of sets which are prepared in the ROM of the selection controller 1120.

In a case where the automobile is in a multilevel parking facility, the welcoming controller 50 receives location level information, at a step S 12, which the GPS receiver 532 determined according to location data from more than four satellites. Then it transmits the location level information to the user terminal 1 at a step S13. The location level information refers to the location along the vertical direction and the welcoming controller 50 may obtain the information from the parking facility. As shown in FIG. 3, the user terminal 1 makes display 542 to show the received location level information. The user terminal 1 can also specify the location thereof (i.e. the location of the user) by means of the GPS receiver 554. In this case, if the located level of the user terminal 1 is different from that of the automobile, the user terminal 1 makes display 542 to show information notifying the difference, as shown in FIG. 3. The user terminal 1 can also specify the location thereof by means of a barometer, which is installed, for example, in the automobile.

At a step S14, the welcoming controller 50 notifies the user of the parking location in the various output patterns by using the lighting device and the sound generators in combination. The lighting devices are effective for notifying the location of the automobile to guide the user to the automobile, when the user is approaching to the automobile in the night. However, at daytime, in which it is difficult to recognize the lighting devices, the sound generators are more effective. Thus, the welcoming controller 50 may preferably use the lighting devices in the night. FIGS. 9 and 10 show some sets of output patterns of the horn and the lighting devices for notifying the parking location. The horn 502 is used as the sound generator, and ones selected from the room lamps 511, the head lamps 504, the hazard lamps 506, and the tail lamps 507 are used as the lighting devices. If the room lamps 511 are turned on, the entire room is brightened up to help the user to easily find the automobile. The head lamps 504 are brightest among the lighting devices in the automobile and appeals well. Since the hazard lamps 506 are located at the front face, at the back face, and in some cases at the side faces of the automobile and blink brightly, they can be recognized from various directions.

Figure 9A:
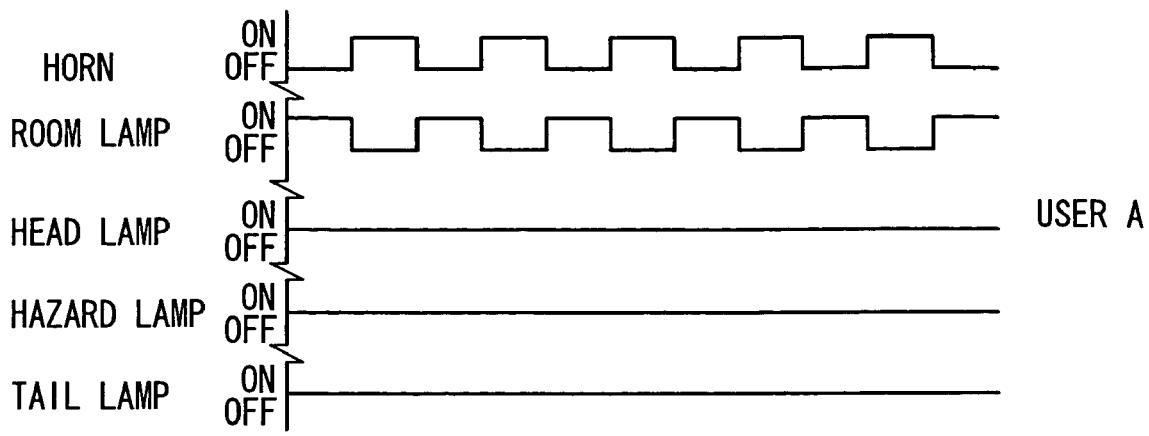
FIGS. 9A to 9C are timing charts showing various patterns to be performed by welcoming actuators.
Figure 9B:
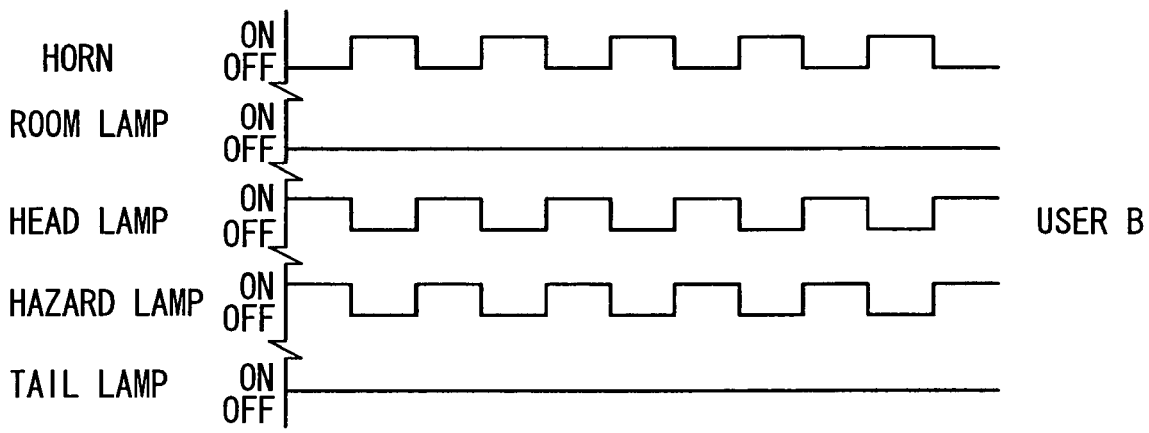
Figure 9C:
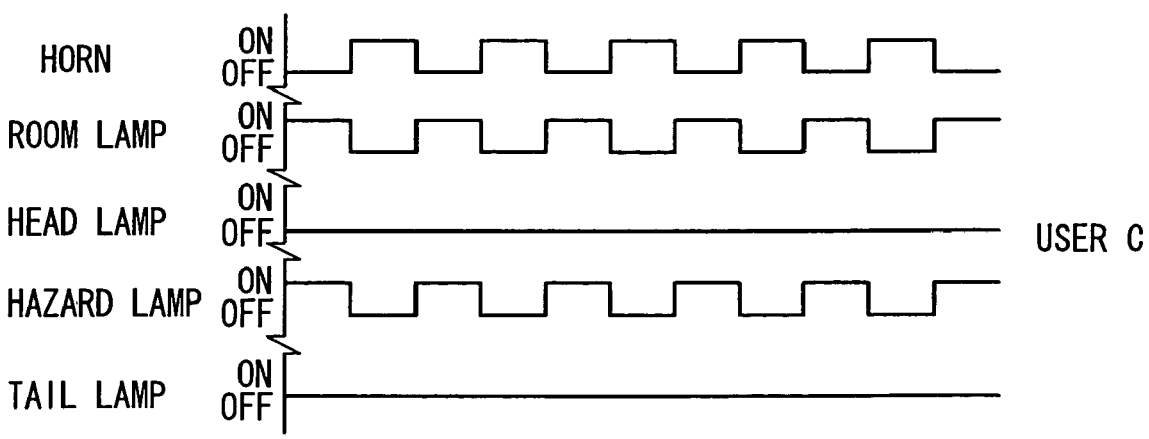
Figure 10A:
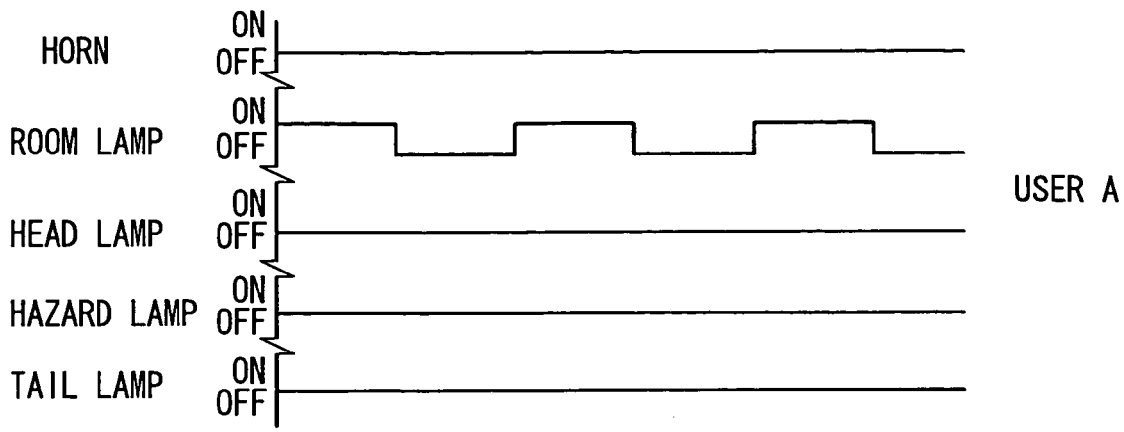
FIGS. 10A to 10C are timing charts likewise showing various patterns to be performed by the welcoming actuators.
Figure 10B:
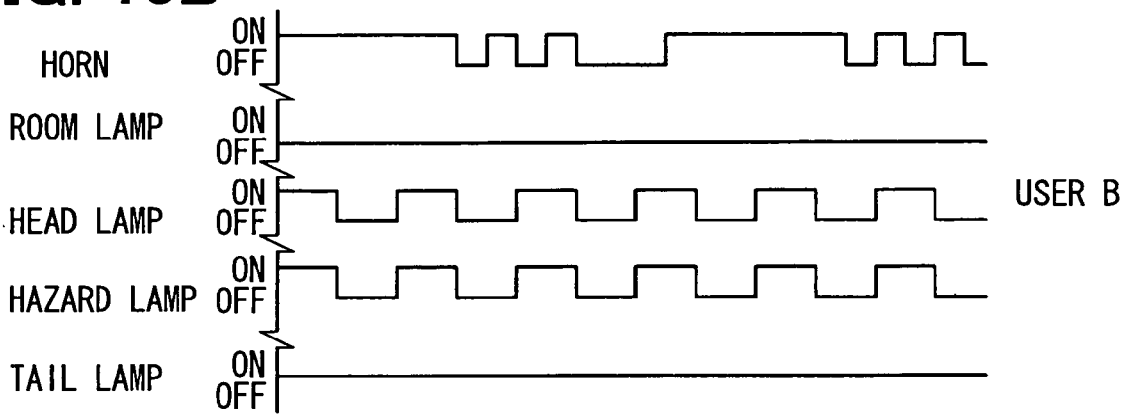
Figure 10C:
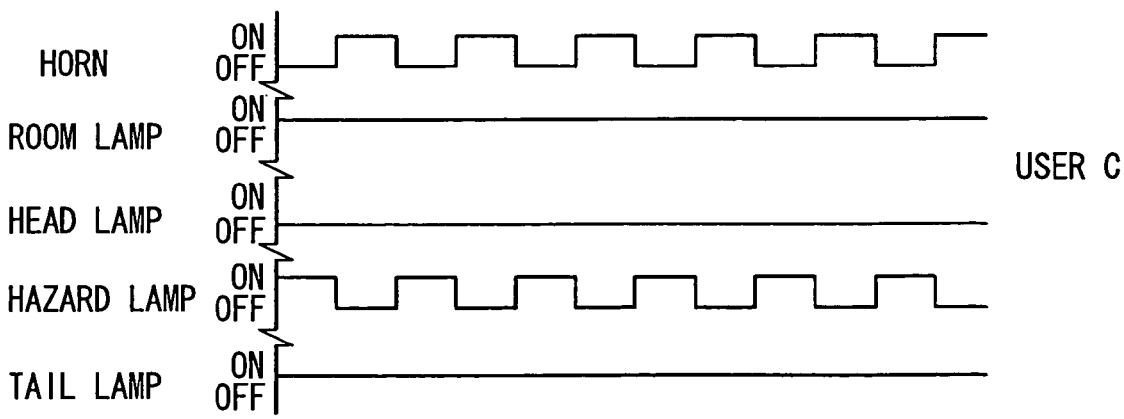

FIGS. 9A to 9C and FIGS. 10A to 10C show different combinations of the sound generator and the lighting devices, in which the different kinds of the lighting devices are combined with the sound generator. In the combinations of FIGS. 9A to 9C, the blinking patterns and the sound generating pattern are similar to each other, while the lighting and the sound generation are alternately performed. In the embodiments of FIGS. 10A to 10C, the blinking patterns and the sound generating pattern are different from each other.

At a step S15 in FIG. 8, the welcoming controller 50 makes a decision whether the user comes closer to the automobile than the second predetermined distance. If the decision is NO, the process returns to the step S14 and continuously notifying the parking location, whereas if the decision is YES, the welcoming controller 50 terminates executing the processes for notifying the parking location. After the termination, the process of FIG. 8 returns to the main process of FIG. 6, and the welcoming controller 50 executes the process for the welcoming operations at a step S5.

The user terminal 1 may send a termination signal to the welcoming controller 50, according to an operation of the inputting unit 305 by the user. In this case, the welcoming controller 50 terminates the notification of the parking location.

Figure 11:
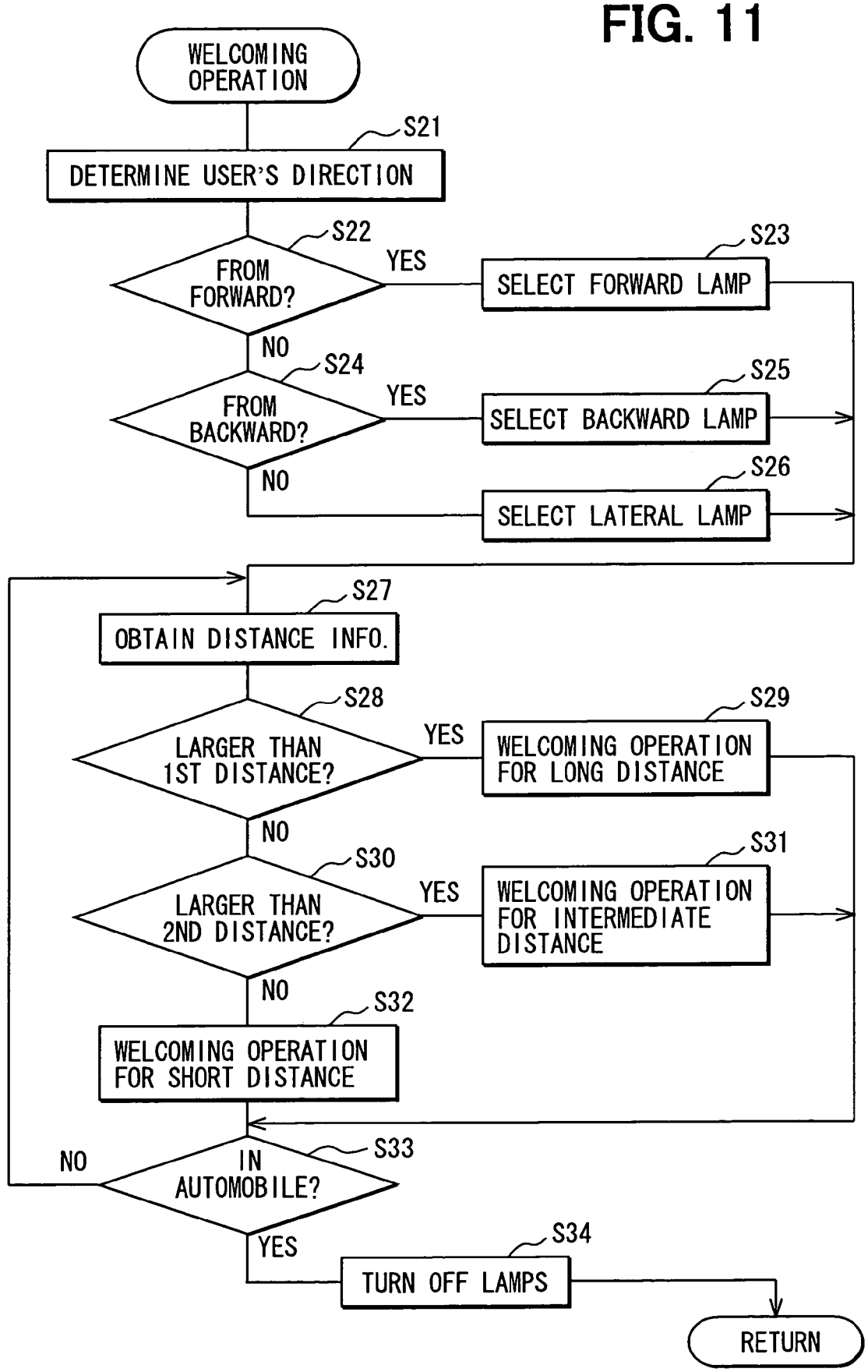
FIG. 11 is a flowchart for a welcoming operation in FIG. 6.

FIG. 11 shows a flowchart of the processes for the welcoming operations of the step S5 of FIG. 6. At a step S21, the welcoming controller 50 determines the direction of the approaching user to the automobile. The determination is made more exactly by referring to detected information from the human sensors 522-525. A proximity sensor or a laser sensor can be used as the human sensors, which may vary their outputs depending on a distance to an approaching person. The welcoming controller 50 detects a direction, from which the user approaches to the automobile, from the human sensor generating the strongest signal. Detectable directions are, for example, a forward direction, a backward direction, and a lateral direction. The welcoming controller 50 can also detect the distance according to the magnitude of their outputs of the human sensors.

In the case that the determined direction is the forward direction at a step S21, the process goes to a step S23, at which the welcoming controller 50 selects forward lights. As shown in FIGS. 12A to 12D, the forward lights include the head lamps 504, the fog lamps 505, and the cornering lamps 508 in the embodiment. In the case that the determined direction is the backward direction, the process goes through steps S24 and S25 in this order, and the welcoming controller 50 selects backward lights. As shown in FIGS. 13A to 13D, the backward lights include the tail lamps 507, the backup lamps 509, and the stop lamps 510 in the embodiment. In the other cases, the welcoming controller 50 regards the lateral direction as the detected direction and executes a step S26. At the step S26, the welcoming controller 50 selects lateral lights. As shown in FIGS. 14A to 14C, the lateral lights include the hazard lamps 506, the tail lamps 507 and the bottom lamps 512 in the embodiment.

At a step S27 of FIG. 11, the welcoming controller 50 specifies the distance between the automobile and the user by means of the outputs of on-board human sensors 522-525. In specifying the distance, the distance information detected by the GPS receivers 532 and 554 may be used as well. At this time, the welcoming controller 50 can specify the sensor (i.e. a portion of the automobile) for which the user is heading, by comparing the magnitude of the outputs of the human sensors. Thus, the welcoming controller 50 also acts as a direction means detecting a direction of the approaching user. In the embodiment, in order to assist in the direction detecting function, auxiliary human sensors 550 are located between the driver's seat 522 and the passenger's seat 523, between the rear-left seat 524 and the rear-right seat 525, and between the passenger's seat 523 and the rear-left seat 524, as shown in FIGS. 12-14. In addition, the auxiliary human sensors 550 may be located between the driver's seat 522 and the rear-right seat 525.

The process goes to a step S28 of FIG. 11, after determining the distance at the step S27. When the distance exceeds a first upper limit (e.g. a value longer than 20 meters), the welcoming controller 50 executes a step S29 to perform the welcoming operation of a long distance lighting mode. At a step S30, when the distance exceeds a second upper limit (e.g. a value between 5 and 20 meters), the welcoming controller 50 executes a step S31 to perform the welcoming operation of an intermediate distance lighting mode. In the other cases, namely when the distance is below the second upper limit, the welcoming controller 50 executes a step S32 to perform the welcoming operation of a short distance lighting mode.

Figure 15:
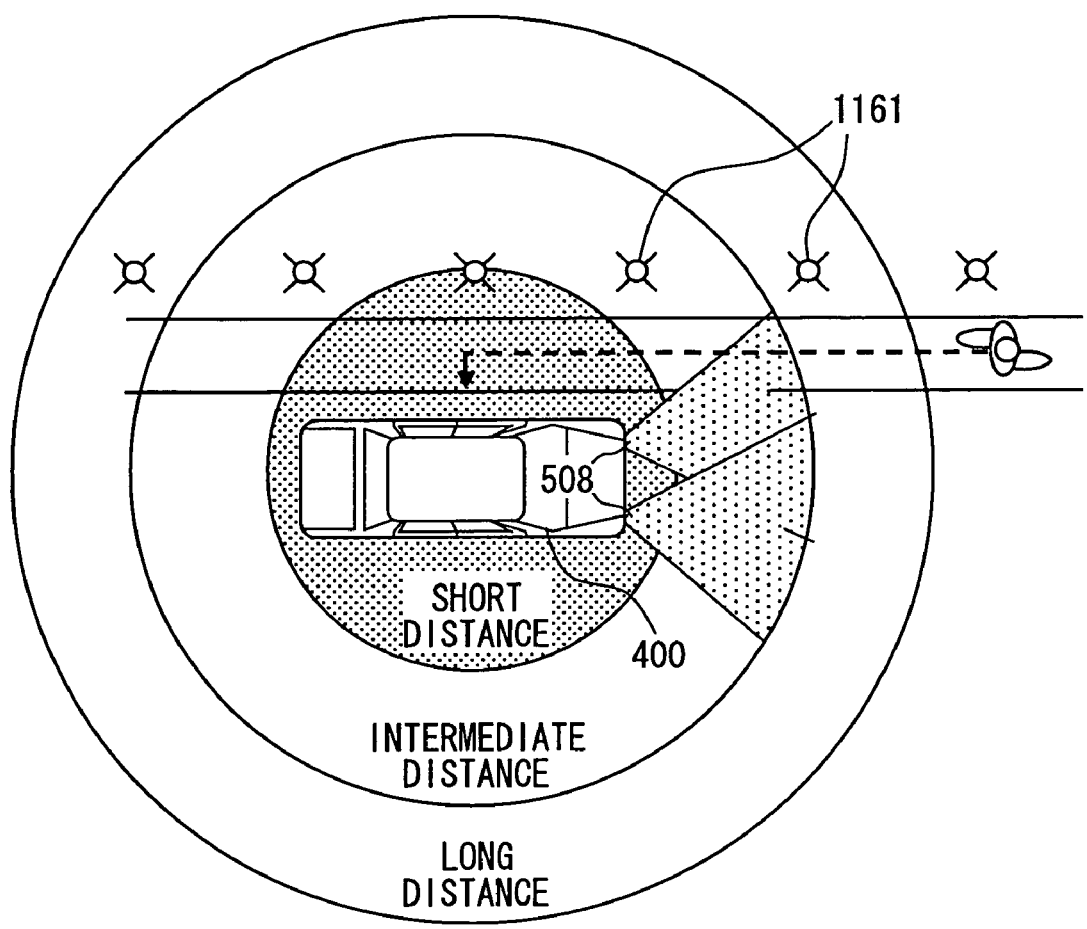
FIG. 15 shows a schematic view showing a distance between a user and an automobile and showing a further example of the welcoming operation depending on the distance.

As shown in FIG. 15, the further the user is from the automobile, the larger the total intensity of light from the lighting devices becomes, under the control of the welcoming controller 50. Thus, among the short distance lighting mode, the intermediate distance lighting mode, and the long distance lighting mode, the total light intensity therein becomes larger in this order. In the case that a beam angle of the lighting devices is controlled, the total light intensity shall be the total intensity of light, which the user receives at a place standing in front of the lighting devices. For example, if the beam angle of the lighting device is directed toward an upper direction, the user in front of the lighting device receives more intensive light, in spite that its light source magnitude is unchanged. Thus, an area between the user and the automobile is illuminated and the user is guided to the automobile safely. Moreover, each of the human sensors 522-525 and 550 is operatively linked with the respective nearest lighting devices. For example, in the short distance lighting mode, the welcoming controller 50 selects the lighting device closest to the human sensor which detects the user most intensively, and turns on the selected lighting device.

In the case that a facility exists around the parking location and has a lighting device, such as the facility's light 1161 shown in FIG. 1, and that the lighting device can be controlled by commands wirelessly sent from the user terminal 1, an operation of lighting up the automobile by the lighting device can be added to one of the welcoming operations. As shown in FIG. 15, if the lighting device is used in the long distance lighting mode, it becomes easier to find out or recognize the parking location by lighting up the automobile. The lighting up the automobile will give a higher sense of security to the approaching user. If the lighting device is used in the intermediate or short distance lighting mode, a wider area around the automobile will be illuminated, so that the user can be more safely and effectively guided to or assisted in getting into the automobile. Furthermore, the user may easily find an obstacle on the ground along the path to the automobile.

FIGS. 12A to 12D are schematic views respectively showing the welcoming operations, in the case that the user U approaches from a forward direction of the automobile. In FIG. 12A for the long distance lighting mode, the head lamps 504 are turned on at a high beam mode.

In FIG. 12B for the intermediate distance lighting mode, the head lamps 504 are turned on at a low beam mode. Thus, the welcoming controller 50 varies either the light source magnitude or the beam angle, in order to adjust the intensity of light (recognized by the user U) originated from the same lighting device. The light source magnitude may be varied, for example, by changing driving voltage. In the case that the user U comes closer to the front face of the automobile, the auxiliary human sensor 550 provided at the middle of the automobile along the width direction can detect the user U most intensively among the human sensors. The welcoming controller 50 can determine the distance to the user U by use of the output from the auxiliary human sensor 550.

In FIG. 12C for the short distance lighting mode, the fog lamps 505 or the cornering lamps 508 are used in place of the above lighting devices mentioned in the other modes. In the case that the detecting intensity by the auxiliary human sensor 550 is high, the fog lamps 505 are turned on. In the case that the user U moves to the lateral side of the automobile, as shown in FIG. 12D, and the human sensor 522 or 523 at an edge along the width direction detects the user U most intensively, then the corresponding cornering lamp 508 is turned on.

Figure 13A:
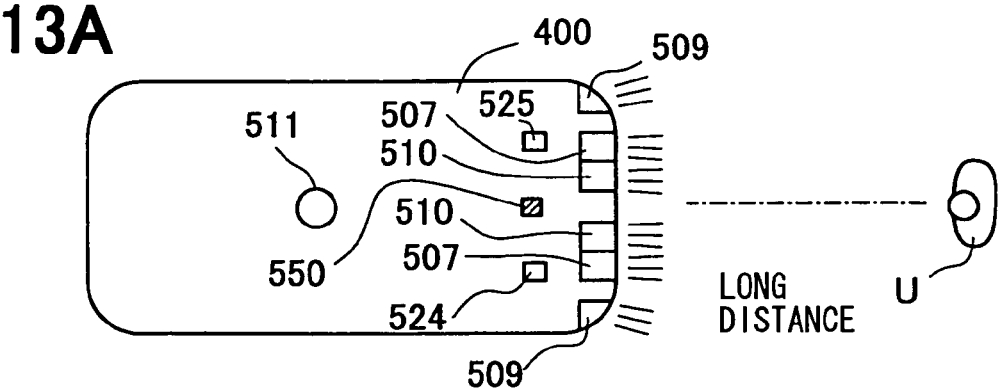
FIGS. 13A to 13D are schematic views likewise showing another example of the welcoming operations.

FIGS. 13A to 13D are schematic views respectively showing the welcoming operations, in the case that the user U approaches from a backward direction of the automobile. In FIG. 13A for the long distance lighting mode, all of the tail lamps 507, the backup lamps 509 and the stop lamps 510 are turned on.

Figure 13B:
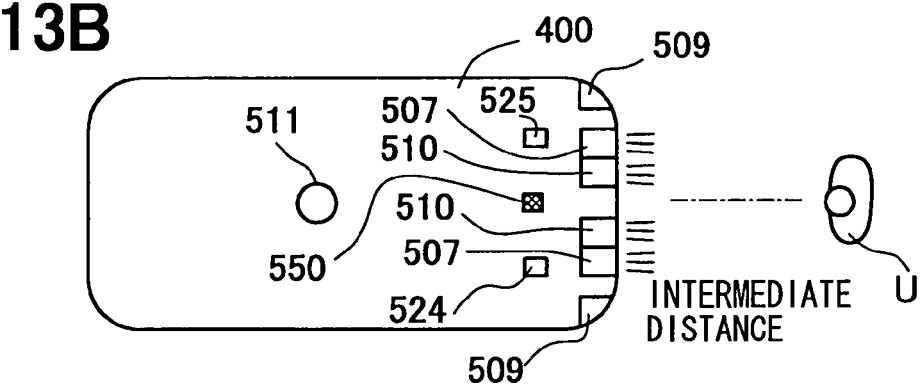

In FIG. 13B for the intermediate distance lighting mode, only the tail lamps 507 and the stop lamps 510 are turned on. Thus, the welcoming controller 50 varies the number of lighting devices to turn on in order to adjust total intensity of the lighting devices. In the case that the user U comes closer to the back face of the automobile, the auxiliary human sensor 550 provided at the middle of the automobile along the width direction can detect the user U most intensively among the human sensors. The welcoming controller 50 can determine the distance to the user U by use of the output from the auxiliary human sensor 550.

Figure 13C:
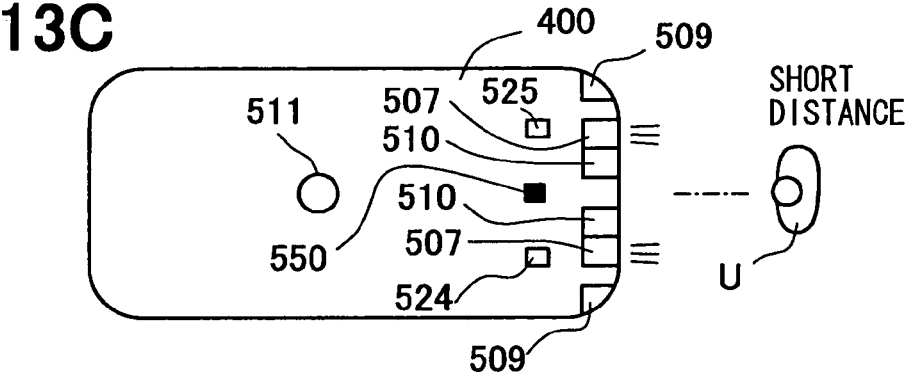
Figure 13D:
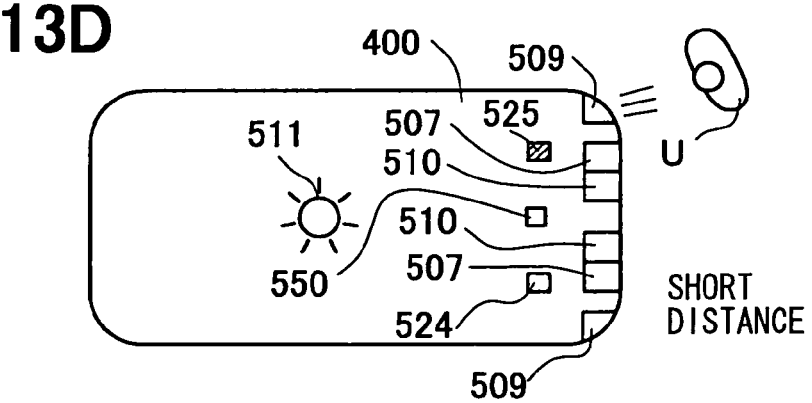

In FIG. 13C for the short distance lighting mode, the backup lamps 509, the tail lamps 507, or the stop lamps 510 are turned on. In the case that the detecting intensity by the auxiliary human sensor 550 is high, only the tail lamps 507 (or only the stop lamps 510) are turned on. In the case that the user U moves to the lateral side of the automobile, as shown in FIG. 13D, the human sensor 524 or 525 at an edge along the width direction detects the user U most intensively, then the corresponding backup lamp 509 is turned on.

FIGS. 14A to 14C are schematic views respectively showing the welcoming operations, in the case that the user U approaches from the lateral direction of the automobile. In FIG. 14A for the long distance lighting mode, all of the hazard lamps 506 and the bottom lamps 512 are turned on.

In FIG. 14B for the intermediate distance lighting mode, only the bottom lamps 512 are turned on. In the case that the user U comes closer to the lateral face of the automobile, the auxiliary human sensor 550 provided at the middle of the automobile along the longitudinal direction can detect the user U most intensively among the human sensors. The welcoming controller 50 can determine the distance to the user U by use of the output from the auxiliary human sensor 550.

In FIG. 14C for the short distance lighting mode, among the bottom lamps 512, only ones which are closer to the user U are turned on. In the case that the detecting intensity by the auxiliary human sensor 550 is higher than that of other sensors, only the bottom lamp 512 at the middle is turned on. In the case that the user U moves to the front side or the back side of the automobile, and the human sensor 523 or 524 at an edge along the longitudinal direction detects the user U most intensively, then the corresponding bottom lamp 512 is turned on. The welcoming controller 50 may alternatively change the beam angle of the bottom lamps 512 according to the user's approach, to guide the user U to the automobile.

In each case of FIGS. 12-14, the room lamps 511 are turned on in the short distance lighting mode, in order to carefully welcome the user who intends to get into the automobile.

Figure 16A:
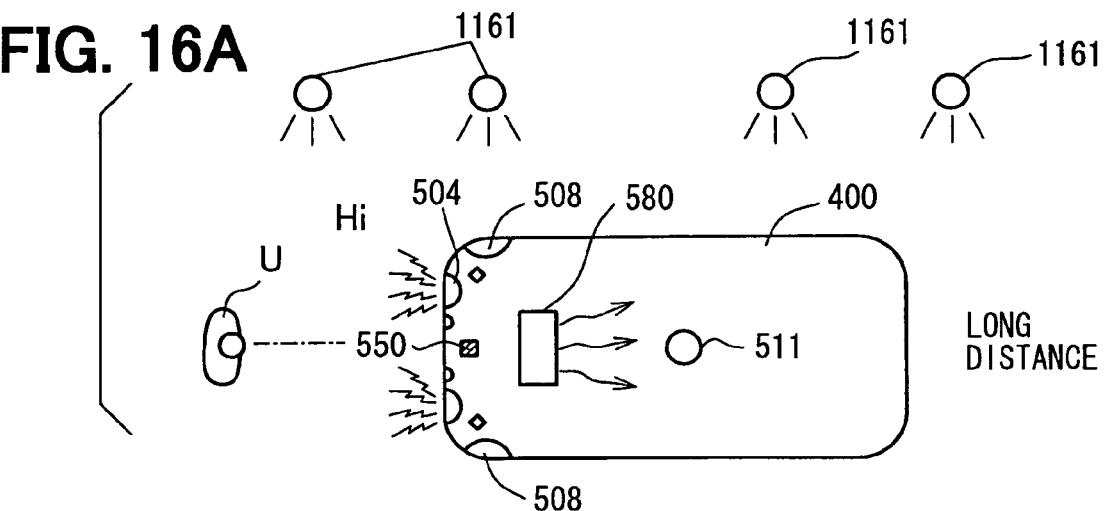
FIGS. 16A to 16D are schematic views showing a still further example of the welcoming operation.
Figure 16B:
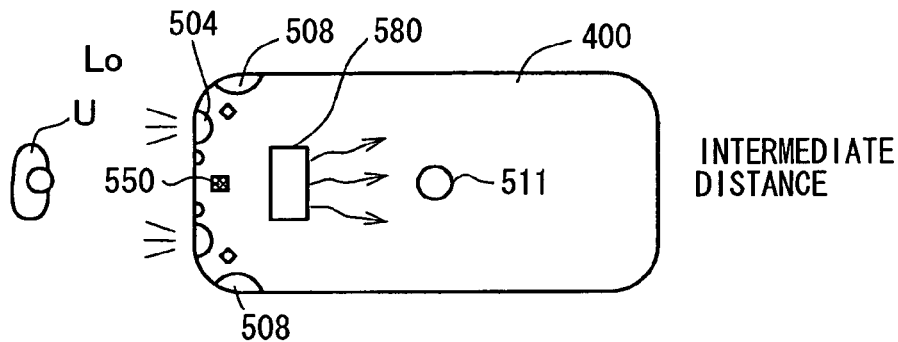
Figure 16C:
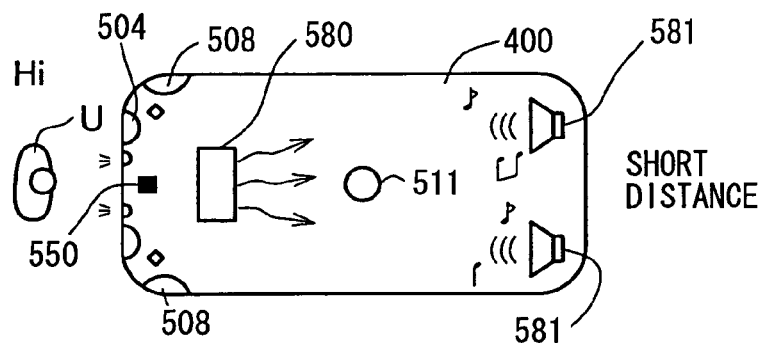
Figure 16D:
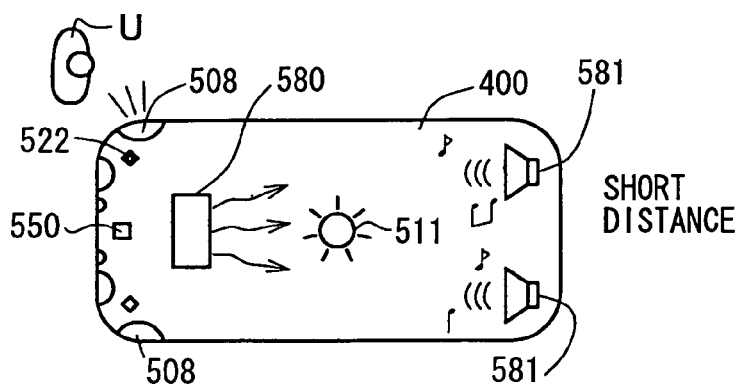

In the embodiment mentioned above, the lighting devices played a dominant role in the welcoming operations. However, as shown in FIGS. 16A to 16D, a car stereo 515 can be used for the welcoming operations. In FIGS. 16C and 16D, when the user comes into the area within the short distance to the automobile, the welcoming controller 50 makes the car stereo 515 to start playing music the user requires. When the user is getting into and is in the automobile, the welcoming controller 50 welcomes the user by the music. In the case that the car stereo 515 has a CD player, the required music is played if the user has inserted his favorite CD into the car stereo 515 beforehand. In the case that the car stereo 515 stores music data in a storage device, such as an HDD, the required music can be also played, if the welcoming controller 50 has stored information to specify the favorite music into the memory device 610 beforehand and makes the car stereo 515 play the music according to the information of the user getting into the automobile. In this embodiment, the air conditioner 514 is likewise activated beforehand in the same manner mentioned above. In addition, the welcoming controller 50 may adjust a position or an angle of electrically-driven seats 516 or an actuator 517 for a mirror angle control according to the preset seat positions or the preset mirror angles.

By the way, since the user usually brings along the user terminal 1 shown in FIG. 3, there is a potential threat of loss and theft. If a third person other than the user operates the user terminal 1 to output the activation command, the automobile will notify the third person of the parking location of the automobile. This situation is undesirable in a viewpoint of security. As the user terminal 1 is the cellular phone in this embodiment, the user brings along it for phone calls even when he does not use his automobile. Therefore, the above risk becomes more significant.

Moreover, the door locking device 513 of FIG. 1 can be operated by remote control, if the inputting unit 305 shown in FIG. 3 is operated to transmit a lock/unlock signal wirelessly to the automobile. Furthermore, it is possible to start the engine operation by the remote control. As a result, if the third person having malicious intention, got the user terminal 1 by chance, the third person could possibly open the door and easily steal the automobile or the equipment therein.

In particular, the system of the present invention notifies the parking location by means of the welcoming actuators, such as lighting devices or the horn, as described above. If the user terminal 1 had fallen into the hands of the malicious third person, and if the user terminal 1 were able to easily transmit the activation command, the system would give information of the parking location to the third person, who definitely had no idea about the location.

In order to avoid the situation, the user terminal 1 has an authenticator means which provide a function for authenticating the user individually. As described above, the user terminal 1 becomes able to transmit the activation command and the lock/unlock signal, only if the authentication is successfully completed.

Hereafter, an exemplary structure of the authenticator means will be described. In the embodiment, the cellular phone 1 has an authentication attribute obtaining unit, which includes at least two detectors selected from a group of a contact biometric attribute detector, a face camera, a bone conduction sound detector, and an air conduction sound detector. The contact biometric attribute detector is arranged at a portion of the cellular phone 1, which is touched by a hand of a target person for the authentication when he holds the cellular phone 1 in a normal state of a phone call holding state. The face camera is arranged at a portion of the cellular phone 1, at which the face camera can take an image of the face of the target person in the phone call holding state. The bone conduction sound detector detects voice information of the target person according to bone conduction sounds. The air conduction sound detector detects voice information of the target person according to air conduction sounds. The cellular phone 1 simultaneously obtains information of the authentication attributes from at least two selected detectors of the authentication attribute obtaining unit. The cellular phone 1 executes the authentication process of the target person, based on the above information of the authentication attributes obtained from each of the selected detectors. In case of a failure of simultaneously obtaining the information of the authentication attributes from the selected two detectors, the authentication process of the target person will not be done.

Figure 17:
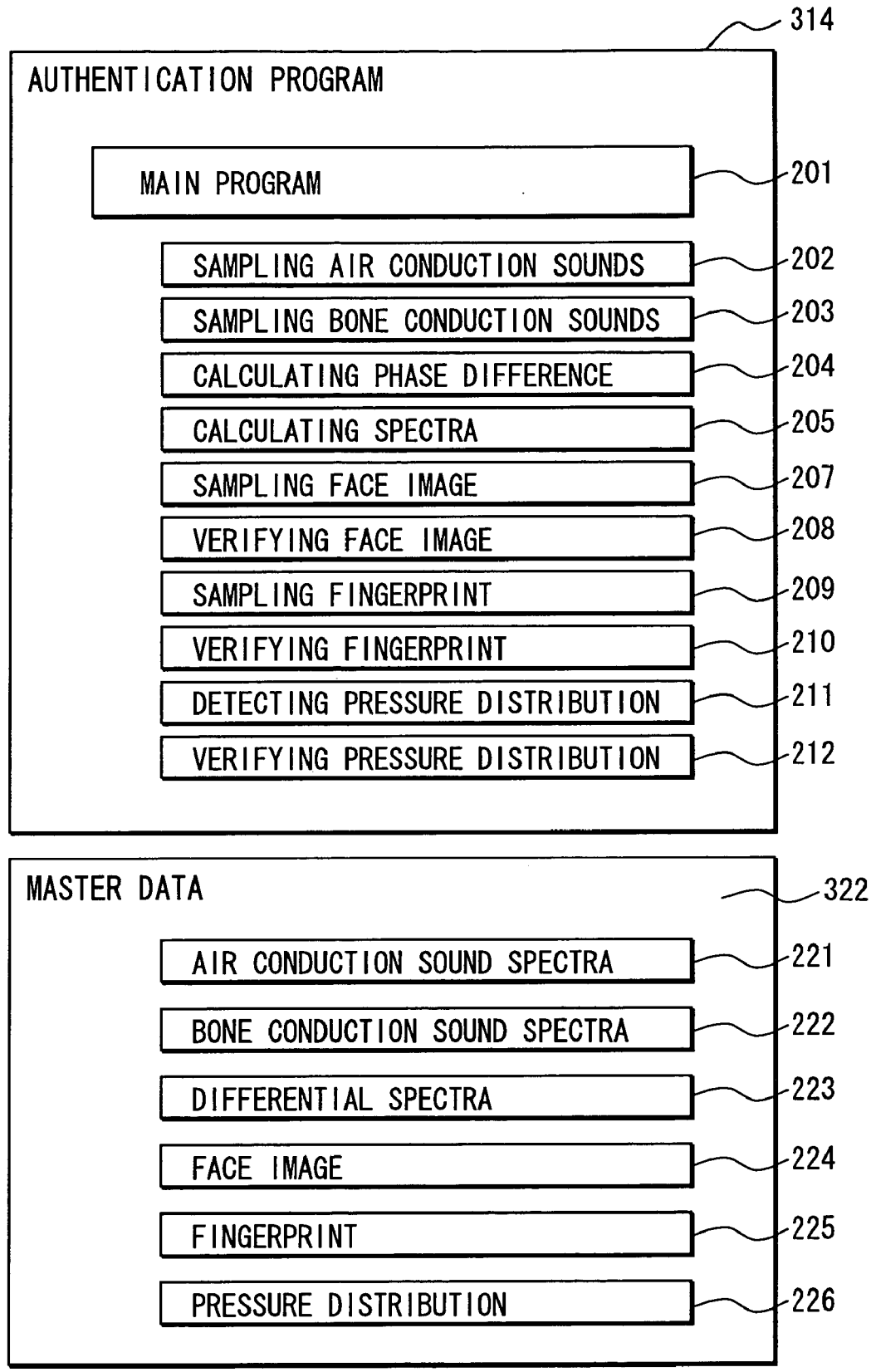
FIG. 17 is a diagram showing various programs and data stored in a memory device (ROM and EEPROM) in FIG. 2.

The ROM 314 (shown in FIG. 2) in the cellular phone 1 stores a communication program and a display program. The communication program is designed for a basic control of wireless phone communications. The display program is designed for a control of the display 542 having a liquid crystal monitor. In addition, as shown in FIG. 17, the ROM314 stores an authentication program, which is designed for determining whether or not a person using the cellular phone 1 is a legitimate user. The CPU 312 (FIG. 2) acts as the authentication means by executing the authentication program. In the embodiment, the authentication process is carried out by a talker identification and verification based on wave profiles of both an air conduction sound and a bone conduction sound. The authentication program includes a main program 201 and sub modules 202 to 212 which the main program 201 uses, as shown in FIG. 17. More specifically, the sub modules include; a module 202 for sampling air conduction sounds; a module 203 for sampling bone conduction sounds; a module 204 for calculating and verifying phase differences between the air conduction and bone conduction sounds; a module 205 for calculating and verifying of spectra of air conduction sounds and bone conduction sounds; a module 207 for sampling face images; a module 208 for verifying face images; a module 209 for sampling fingerprints; a module 210 for verifying fingerprints; a module 211 for detecting pressure distributions; and a module 212 for verifying pressure distributions. The module 211 for detecting pressure distributions is designed for detecting the pressure-sensed area mentioned before. The CPU 312 executes these programs by using the RAM 313 shown in FIG. 2 as a working area.

Figure 18:
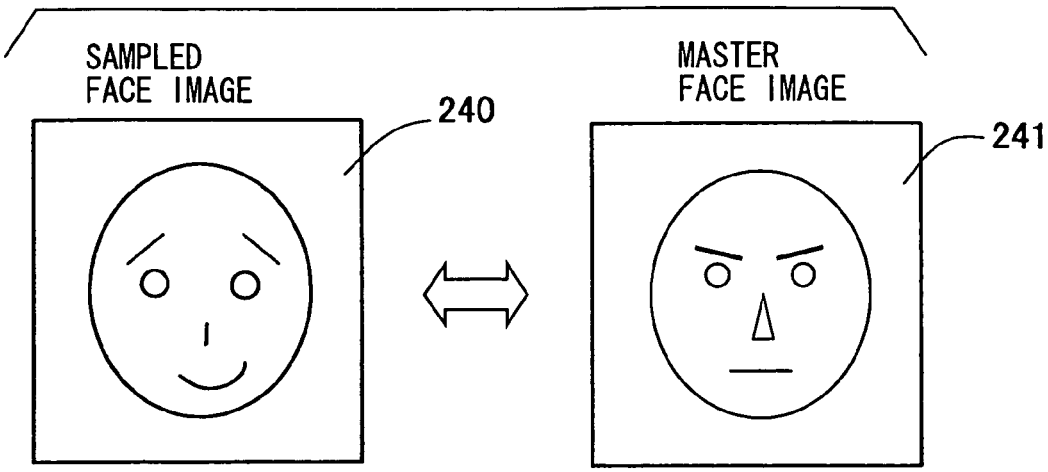
FIG. 18 are schematic views showing face images between master data and data taken for authentication.
Figure 19:
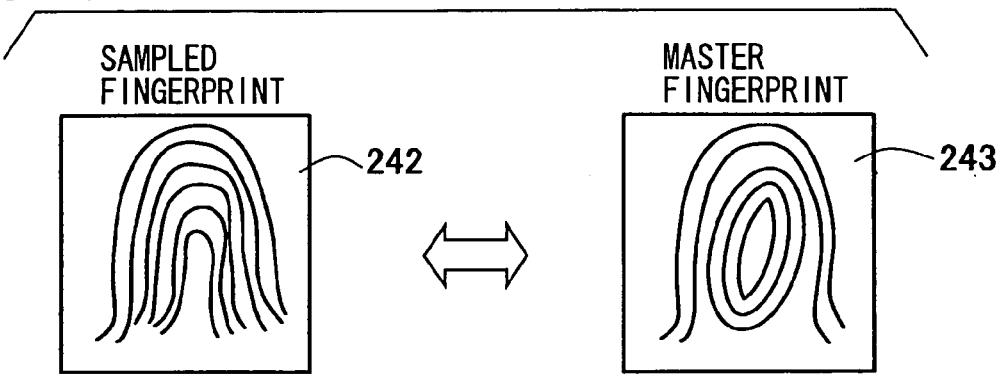
FIG. 19 are schematic views showing fingerprints between master data and data taken for the authentication.
Figure 20:
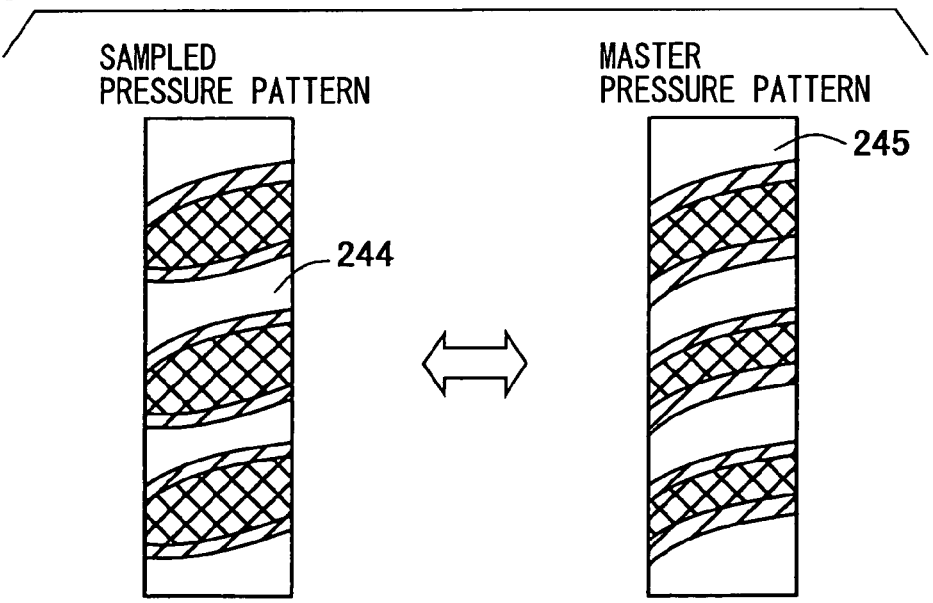
FIG. 20 are schematic views showing pressure distribution patterns between master data and data taken for the authentication.

The EEPROM 322 (FIG. 2) stores master data (the master data for authentication) of sound spectra which are used in verifying spectra in the authentication by voice. The verification is carried out by the module 205. The master data for authentication has master data 221 of air conduction voice spectra, master data 222 of bone conduction voice spectra, and master data 223 of differential spectra between them. In addition, the EEPROM 322 has master data 224 for face images, master data 225 for fingerprints, and master data 226 for pressure distributions. The master data 221 and 222 are composed beforehand in a manner as below. Firstly, the cellular phone 1 detects wave profiles of predetermined phones, words, or sentences for verification enunciated by the legitimate user through the voice transmitter 304 for air conduction sounds and the bone conduction microphone 340. Then the cellular phone 1 obtains the spectra of the detected wave profiles by the Fourier transformation. Then, the obtained spectra become the master data 221 and 222. In addition, the master data 224, 225 and 226 are likewise composed beforehand by obtaining corresponding data through the face camera 341, the fingerprint detector 342, and the surface touch sensor 343, respectively. The exemplary view of the master data 224, 225 and 226 are shown in FIGS. 18, 19, and 20, respectively. All the master data are stored in re-writable ROM, such as EEPROM 322, and are loaded to a data memory for the authentication within the RAM 313 according to need. This is because these master data differ from one user to another, and it is desirable to make the master data updatable in order to achieve sufficient security.

Figure 21:
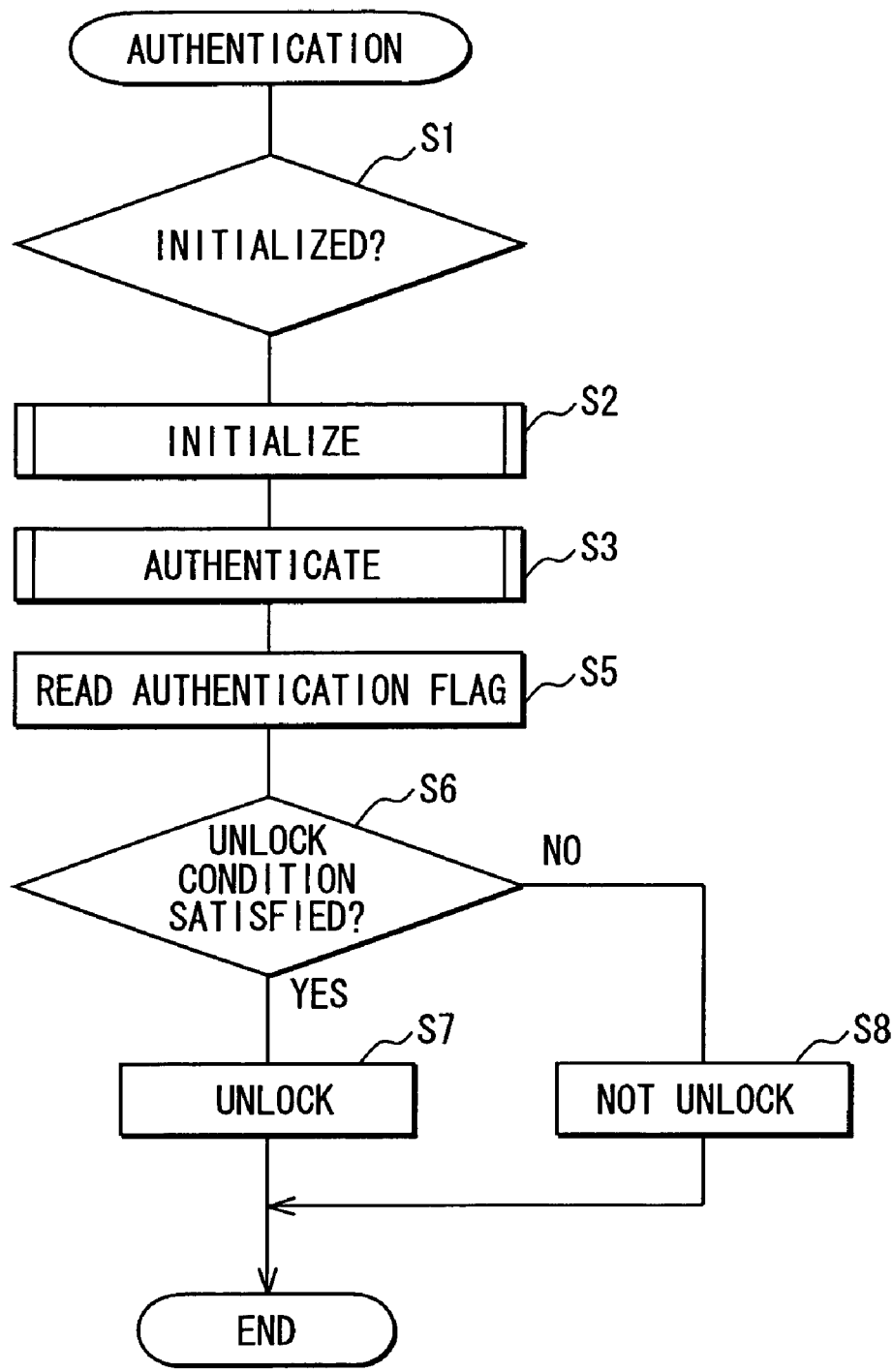
FIG. 21 is a flowchart for processing a main authentication program.

Since the use of the cellular phone 1 in telephone calls is widely known, its detailed description is omitted. Hereafter, a detailed description will be given to the authentication process which is performed before the actual use of the cellular phone. FIG. 21 shows a flowchart of the main program 201 shown in FIG. 17. To execute the authentication, it is necessary to execute an initialization, such as registration of master data for the verification (Steps S1 and S2). The initialization is skipped, once it has been executed, except for the case where the master data are to be updated. At a step S3, the authentication is executed as a main process of the main program 201. According to the result of the authentication, the cellular phone 1 sets an authentication flag, for example, in the RAM 313. The authentication flag shows whether or not the user is allowed to use the cellular phone 1. At a step S5, the authentication flag is read. In the case that the flag satisfies a preset condition, the lock of the cellular phone 1 is released at a step S7, that is, the use of cellular phone 1 is allowed. In the case that the flag does not satisfy the preset condition, the lock of the cellular phone 1 is not released at a step S8, that is, the use of cellular phone 1 is prohibited.

Functions allowed to use by releasing the lock, may include not only well known phone calling functions, such as connecting to a telephone network, connecting to the Internet, and sending e-mails, but also remote controlling functions of the automobile, such as locking/unlocking the doors of the automobile, starting the engine, turning on and off the head lamps and the room lamps.

The initialization process and voice recognition process are described with reference to FIGS. 22-26, before making detailed description of the authentication. Each of the processes mainly consists of voice data processing for obtaining and modifying voice data. In talker authentication technology, various methods are proposed to make the target person of the authentication enunciate the predetermined voice for authentication. Although ways of obtaining the master data differ among the various methods, they are well known. A brief description thereof will be given below.

(1) A method of enunciating one character or one phone (ex, a vowel):

The cellular phone 1 designates and notifies the character or the phone and executes sampling.

(2) A method of sequentially enunciating a combination of characters:

The cellular phone 1 basically does the same process as in the above method (1). It designates and notifies the order of the characters. The order may be fixed or may be randomly changed every time the authentication is executed. The latter case can prohibit the target person from using prerecorded voice.

(3) A method of enunciating a word:

The word to be enunciated may be fixed or may be selected from multiple words by the user. In the latter case, the cellular phone 1 (FIG. 3) makes the display 542 to show a list of words for verification, accepts the selection through the inputting unit 305, and executes the sampling of the voice enunciated by the user. The user terminal 1 may designate the number of characters or the duration of recording, accept a favorite word the user freely determined through the inputting unit 305, and execute the sampling of the voice enunciated by the user. In this case, the freely determined word can be also used as a password. In a more complicated method, the user terminal 1 may ask a question, for which only the legitimate user can answer, and verify the answered voice with the pre-registered answer word. In this case, it is necessary to input or select the question and the answer, in advance, at the stage of the initialization.

(4) A method of enunciating a sentence:

The cellular phone 1 basically does the same process as in the above method (3). In the question/answer method mentioned above, a plurality of questions and answers may be inputted interactively.

In the bone conduction sound, sound components originated from vibrations of a vocal cord, such as vowels, appear more intensively than those in the air conduction sound. It is because the bone conduction sound is more similar to the vibrations of the vocal cord than the air conduction sound. On the other hand, fricative sounds and plosive sounds appear more intensively in the air conduction sound than in the bone conduction sound, because the fricative sounds and plosive sounds are subject to sound producing organs other than the vocal cord, such as a tongue and lips. Accordingly, it is preferable to designate a voice containing such kinds of phones as the vowels, the fricative sounds, and the plosive sounds, as a voice for using in the authentication, in the case that the authentication is to be executed according to the differences between the bone conduction sound and the air conduction sound, in particular when the authentication is carried out based on the differences in wave profiles or differences in frequency spectra, for example, by differential spectra. Namely, it is preferable to choose such a voice, in which the phone kind most dominant in number is one of the vowels, the fricative sounds or the plosive sounds. Such voices are, for example, "sa shi su se so", "shi shi shin chu no mu shi", "a i u e o" and so on. In addition, it is needless to say that a phone of "sa"-line, "ta"-line, and "a"-line in the order of the Japanese syllabary can be likewise selected. In case of enunciating the vowels, an anterior part of a tongue is used for articulation of "i" and "e", whereas a posterior part is used for articulation of "u" and "o". Therefore, "i" and "e" are more clearly recognized in the air conduction sound, whereas "u" and "o" are more clearly recognized in th bone conduction sound. Thus it is effective to designate such a voice, which mainly contains either the group of "i" and "e" or the group of "u" and "o", such as "ie (house in Japanese)", "koubo (yeast in Japanese)".

Figure 27:
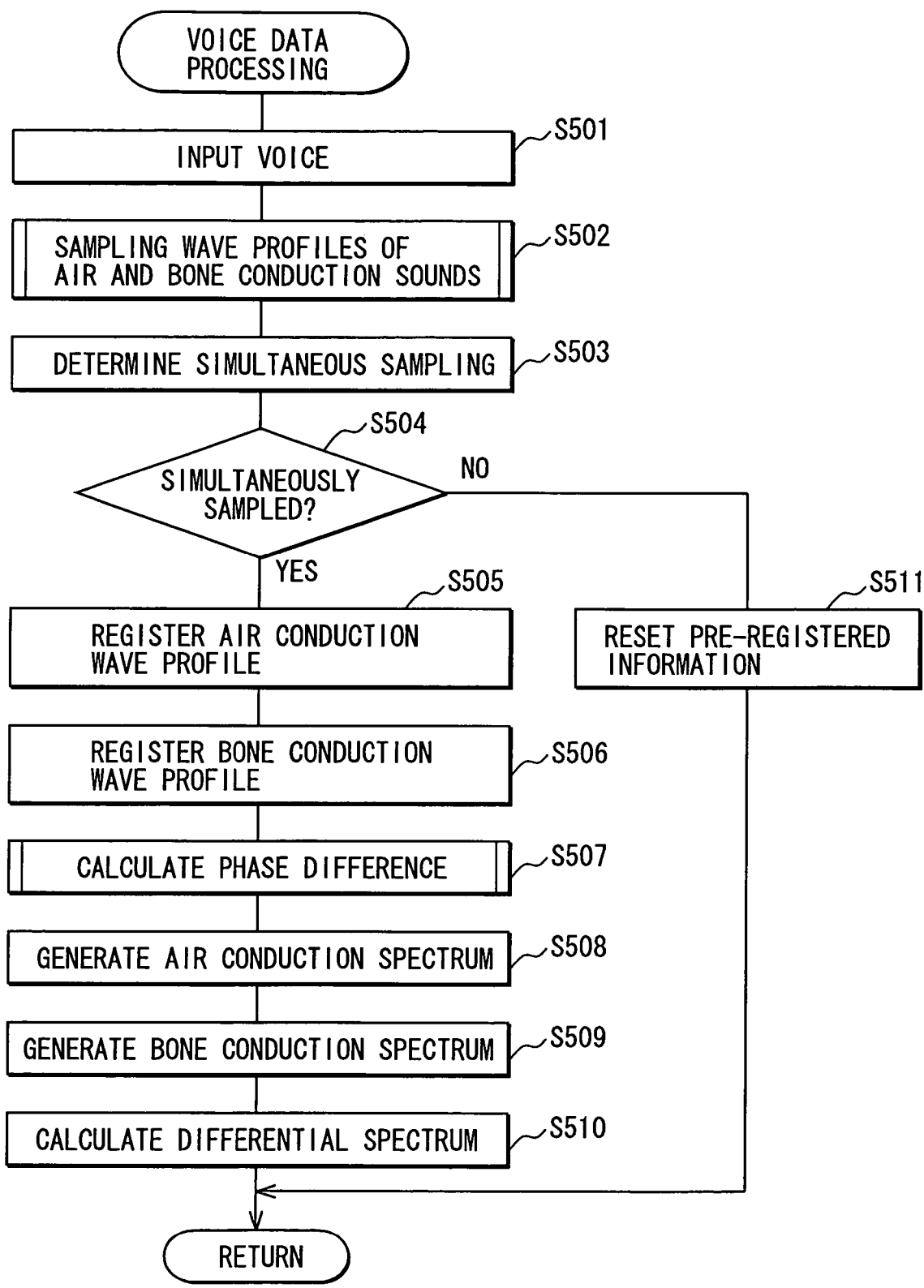
FIG. 27 is a flowchart of voice data processing.
Figure 28:
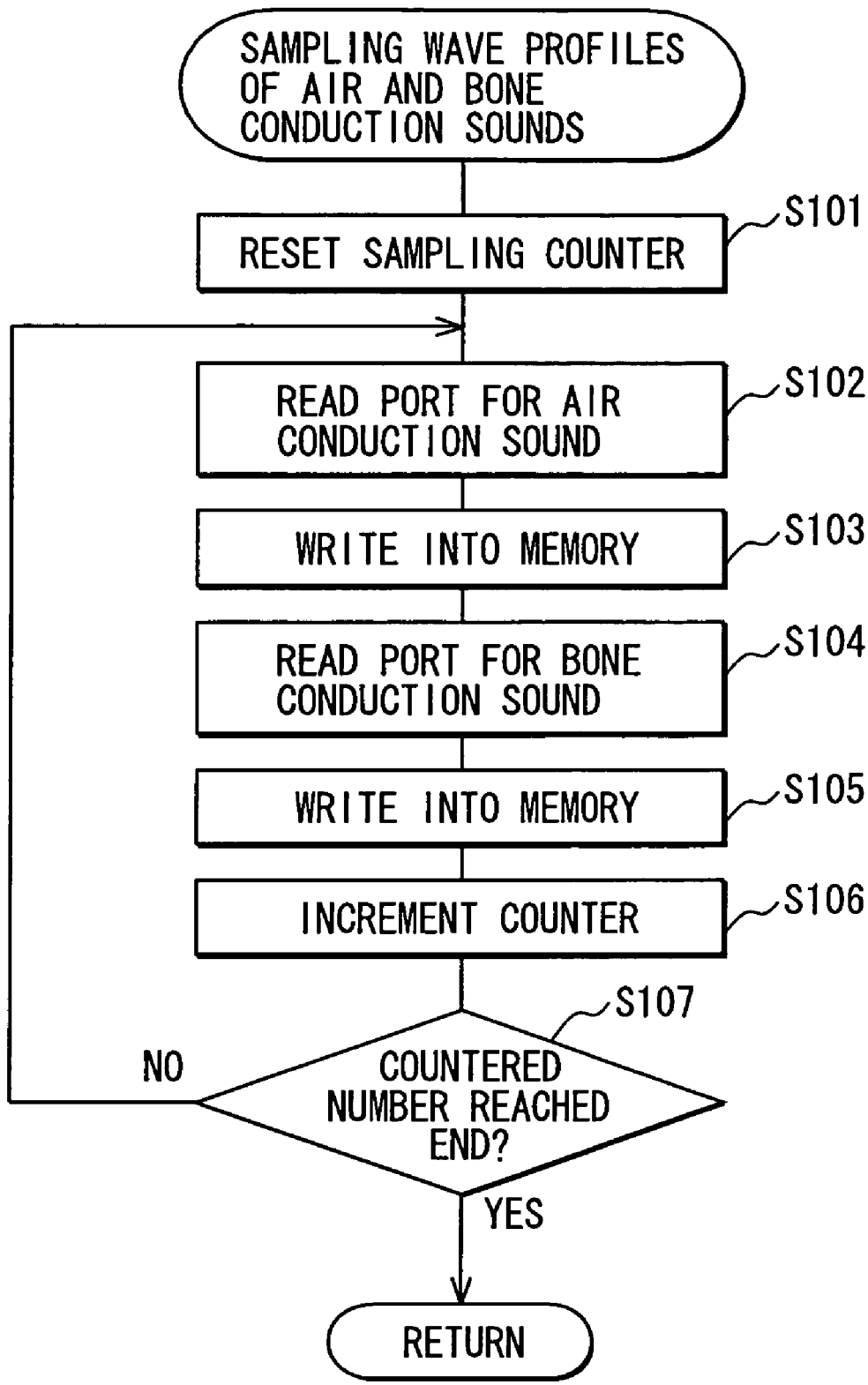
FIG. 28 is a flowchart of sampling of the air conduction sound and the bone conduction sound.

The user terminal 1 executes the voice data processing, for example, along the flowchart shown in FIG. 27. At a step S501, the user terminal 1 receives the designated voice which the user inputted via the voice transmitter 304 and the bone conduction microphone 340. At a step S502, the user terminal 1 executes sampling of the received voice by executing the modules 202 and 203 shown in FIG. 17. Since the user produces the designated voice just once, the sampling by means of the two modules must be made not sequentially but simultaneously. Therefore, in a first authentication using the modules 202 and 203 as described below, the bone conduction sound and the air conduction sound are simultaneously obtained, which respectively correspond to the information of the authentication attributes. If the user terminal 1 uses a single CPU for the two modules, the user terminal 1 executes the modules in parallel by means of time-sharing system, as shown in FIG. 28. More specifically, at a step S101, it resets a sampling counter. After the step S101, it alternatively repeats steps S102-S105 with the counter being incremented. At the step S102, it reads a port connected with the microphone for the air conduction sounds, and writes the read data to the memory at the step S103. At the step S104, it reads a port connected with the microphone for the bone conduction sounds and writes the read data to the memory at the step S105. The user terminal 1 decides in advance total sampling duration according to the size of voice data to be sampled, and terminates the sampling when the sampling counter reaches the total duration at a step S107. This will make impossible to successfully obtain data for the bone conduction sound and the air conduction sound, unless it simultaneously executes the sampling for both sounds. For example, this will efficiently prevent a deception, in which a voice is sequentially inputted by using a device such as a tape recorder.

In case of inputting the voice data of the word or the sentence, the user terminal i may determine whether or not the input of the voice data having the designated content or meaning is completed, by means of the well known voice recognition technology. If it is completed, then the user terminal 1 may terminate the sampling. In this case, the counter becomes unnecessary. In addition, the user terminal 1 may independently execute the sampling of the bone conduction sound and the air conduction sound with two different CPU's. In this case, it can execute the parallel sampling without the time sharing system.

As shown in FIG. 27, after completing the sampling of both the air conduction sound and the bone conduction sound in the form of the wave profile, the user terminal 1 checks whether or not both of the sounds are simultaneously sampled, at a step S503. There are various methods to carry out the checking. In the case that the air conduction sound and the bone conduction sound are intentionally inputted with different timings, either one of the sounds will run off the sampling duration and thereby the wave profile of such sound must contain a silent period. Accordingly, in one of the methods using the above phenomenon, the user terminal 1 makes a decision whether or not either one of the air conduction sound and the bone conduction sound has a continuous period, which is longer than a predetermined duration, and in which the amplitude of the wave profile is always lower than a predetermined lower limit. If the decision is NO at a step S504, then the user terminal 1 concludes that the air conduction sound and the bone conduction sound are inputted without synchronization, and proceeds to a step S511 to output an error message or a warning and to stop executing the voice data processing.

Figure 25:
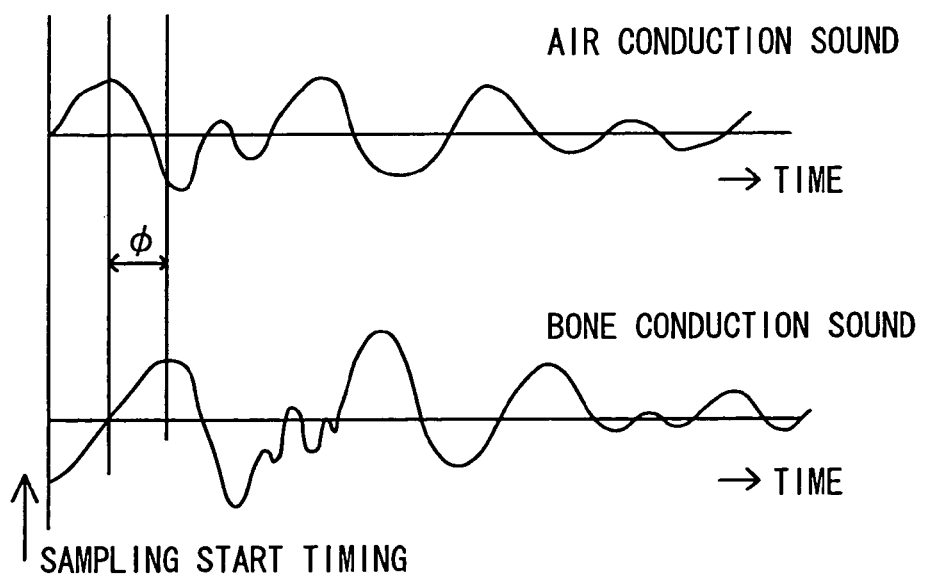
FIG. 25 is a diagram showing wave profiles of an air conduction sound and a bone conduction sound.

In the case that the user terminal 1 concludes that both of the air conduction and bone conduction sounds are simultaneously inputted, it proceeds to a step S505 and its subsequent step S506 to store the wave profiles of sampled sounds to the memory. Subsequently, it executes calculations of complex voice attributes to act as the complex voice attribute calculation means. At a step S507, it calculates the phase difference between the wave profiles of the air conduction sound and the bone conduction sound. The calculation is made by executing the module 204 (FIG. 17). FIG. 25 shows an exemplary view of sampled wave profiles of the air conduction sound and the bone conduction sound, which are simultaneously sampled by the respective microphones. In calculating the phase difference, it compares both of the wave profiles by superposing one of the profiles on the other. A phase of simply superposed wave profiles, wherein both of the sampling start timings are brought together, is referred to as a reference superposed phase position. Since both of the wave profiles have a larger number of frequency components, which are common to each other, a minimum phase difference can be calculated by moving (shifting) the phase of one of the wave profiles with respect to that of the other wave profile. More specifically, a differential wave profile is calculated from both of the wave profiles for the air conduction and bone conduction sounds, as shown in FIG. 26C. Then, integrated amplitude (i.e. average amplitude) of the differential wave profile is calculated. When the phase difference is changed by shifting one of the wave profiles with respect to the other wave profile, the integrated amplitude is accordingly changed. When the integrated amplitude becomes minimum, then the phase difference likewise becomes minimum. A shifted amount of the phase corresponds to the phase difference $\phi$ having existed in the reference superposed phase position.

Any parameter primarily depending on the phase difference $\phi$ can be used for the authentication. Therefore, the following phase difference can be used for the authentication, in addition to the phase difference between the reference superposed phase position and a specific phase position at which the integrated amplitude of the differential wave profile becomes minimum:

(1) a phase difference, at which the integrated amplitude of the differential wave profile becomes minimum;
(2) a phase difference, at which the integrated amplitude of an added wave profile becomes minimum; and
(3) a phase difference, at which the integrated amplitude of the added wave profile becomes maximum.

Figure 29:
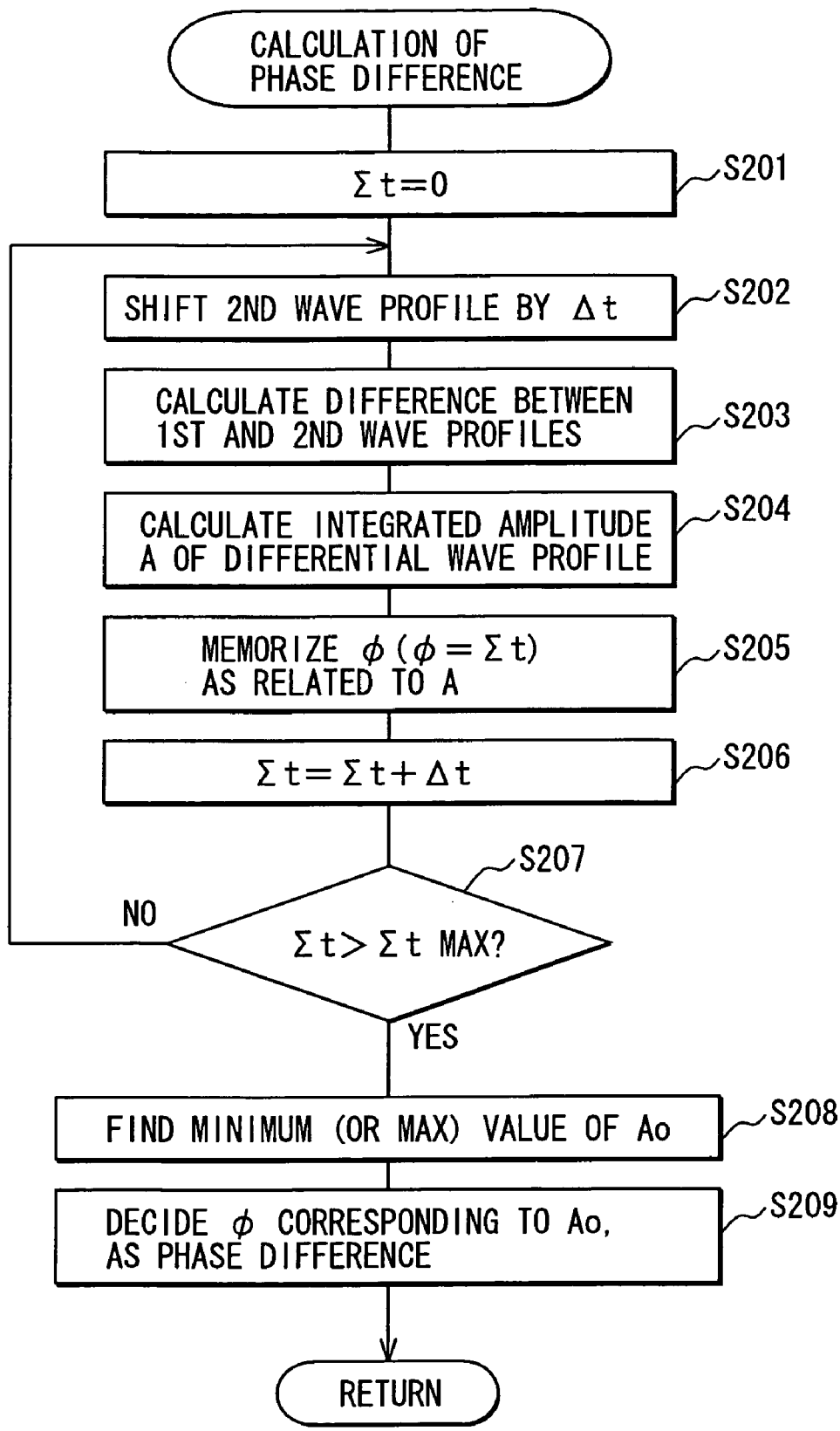
FIG. 29 is a flowchart of calculating phase difference between the air conduction sound and the bone conduction sound.

The calculation of the phase difference $\phi$ between the reference superposed phase position and the specific phase position, at which the integrated amplitude of the differential wave profile becomes minimum, will be described below with reference to a flowchart shown in FIG. 29. At a step S201, the user terminal 1 resets a phase difference $\Sigma t$. The wave profile is a sum of sine waves and the phase difference $\Sigma t$ is expressed in the unit of time, instead of the unit of angle, in the calculation. In the flowchart of FIG. 29, one of the two wave profiles is referred to as a first wave profile, whereas the other wave profile is referred to as a second wave profile. At a step S202, the user terminal 1 shifts the second wave profile by a predetermined short time At with respect to the first wave profile. At a step S203, the user terminal 1 calculates the differential wave profile between the first and second wave profiles. At a step S204, the user terminal 1 calculates the integrated amplitude A. The calculation of the integrated amplitude A is carried out in a well known method. For example, the differential wave profile is expressed as a function of time f(t), the sum of the values f(t) is calculated for all the sampling times t, and the sum is divided by the number of the sampling numbers N, to obtain a central value f0. Then the sum of the values |f(t)−f0| is calculated for all sampling times t, and the sum is divided by the sampling numbers N, to obtain the integrated amplitude A. At a step S205, the phase difference Σt is regarded as the phase difference φ and the phase difference φ is memorized as a related value to the integrated amplitude A.

At a step S206, Σt is incremented by Δt. The processes from the step S202 to the step S206 are repeated until the Σt reaches a predetermined upper limit Σtmax. It is preferable to make a duration of sample voices for the authentication be more than a certain value, for example one second, so that the user can produce the voices comfortably. It is preferable to make the Σtmax be about 0.5-2.0 ms, when considering that the total amount of the phase shifts from 0.5 to 2 wavelengths is sufficient to find the phase difference, and that frequency of human's voices is 1-2 kHz in average. In addition, it is preferable to make the sampling period Δt be about ¹⁄₁₀₀₀-¹⁄₁₀ of the Σtmax. A range, within which the phase of the second wave profile is moved, may extend in a positive or a negative direction, or in both directions, with respect to the reference superposed phase position.

After finishing the above calculation, the process goes to a step S208, at which a minimum value A0 is selected among the stored integrated amplitudes A. Subsequently, at the step S208, the phase difference φ0 corresponding to the minimum integrated value A0 is decided. As shown in FIG. 23, there is quite a difference between the spectra of the bone conduction sound and the air conduction sound. Namely, there are some frequency components, which are not common to both of the sounds. For example, the bone conduction sound tends to loose spectral intensity at a higher frequency range. Therefore, in calculating the phase difference φ0, it is preferable to pick up a frequency range, in which both of the sounds have more common frequency components, and to proceed the calculation after having carried out filtering.

Figure 22A:
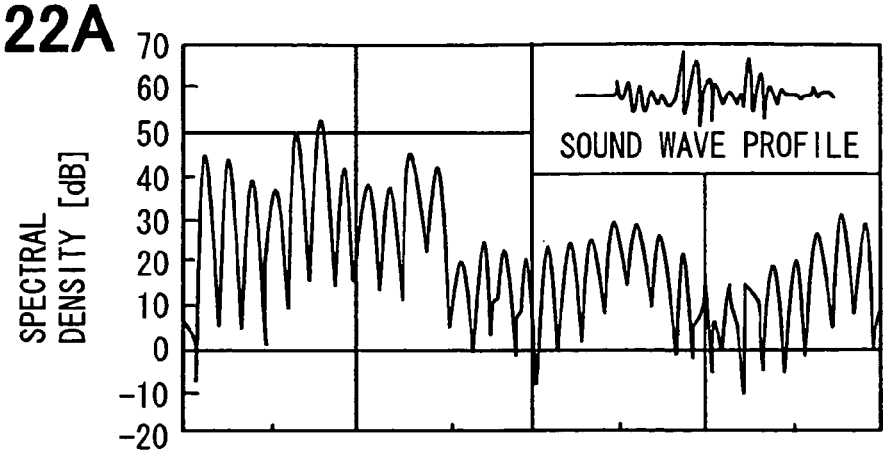
FIGS. 22A and 22B are diagrams showing spectrum of a sound and an envelop of the spectrum.
Figure 22B:
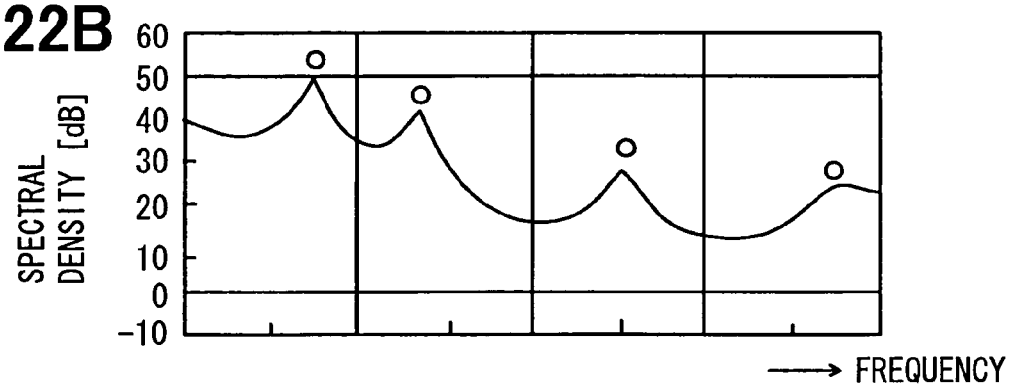

At steps S508 and S509 shown in FIG. 27, the user terminal 1 calculates and stores frequency spectra of the air conduction sound and the bone conduction sound. The calculation is made by applying the well known Fourier transformation to the original wave profiles of the sounds. However, in talker recognition, abstract spectral profiles, such as the profile shown in FIG. 22B, are preferable than fine spectral profiles, such as the profile shown in FIG. 22A. This is because the abstract spectral profiles reflect mainly vocal quality. Furthermore, it is known that the abstract spectral profiles exceed the fine spectral profiles in measurement repeatability, that the abstract spectral profiles can be effectively used as personal identification information, and that the abstract spectral profiles are more easily used in the verification process. The abstract spectral profiles are also called as spectral envelopes and can be obtained by various methods. For example, there are nonparametric analyses, such as a short period autocorrelation analysis, a short period spectrum analysis, a cepstrum analysis, a band filter bank analysis, and a zero intersection number analysis. Moreover, there are parametric analyses, such as a linear predictive analysis, a maximum likelihood spectrum estimation, a covariance analysis, a PARCOR analysis, and an LPS analysis.

Figure 26A:
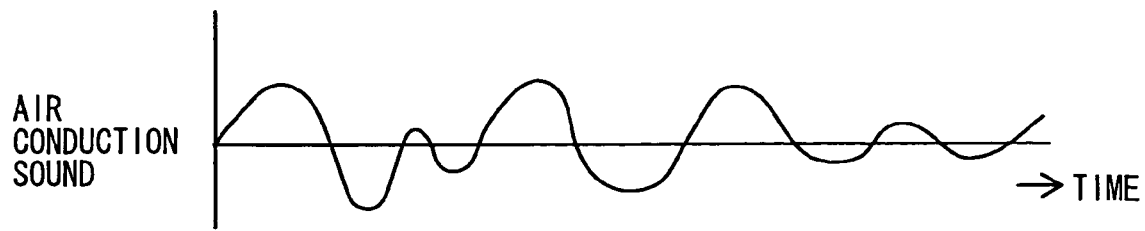
FIGS. 26A to 26C are diagrams showing the wave profiles of the air conduction and bone conduction sounds, as well as a differential wave profile between the air and bone wave profiles.
Figure 26B:
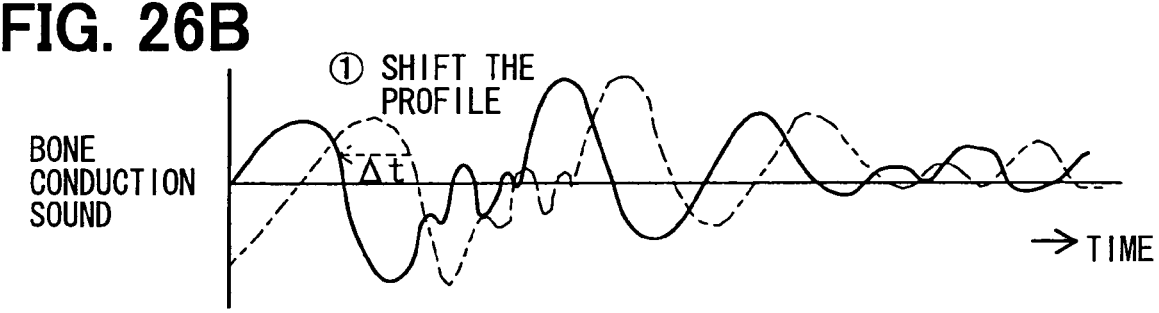
Figure 26C:
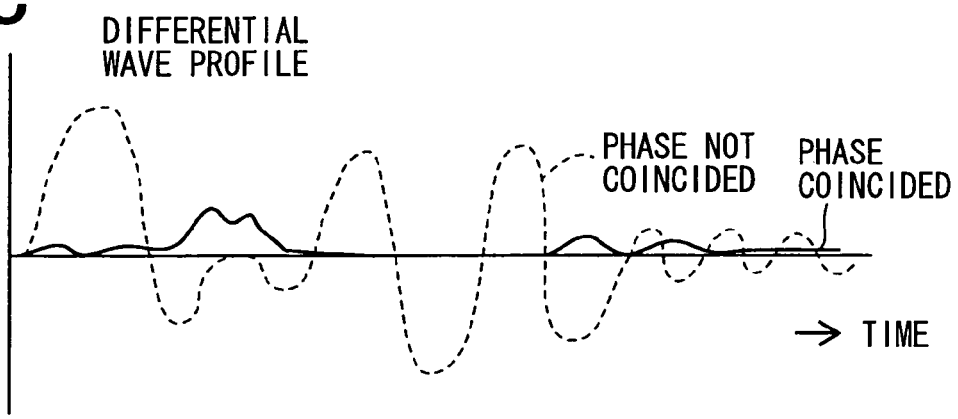

At a step S510 shown in FIG. 27, the user terminal 1 calculates the differences between the calculated frequency spectra of the air conduction sound and the bone conduction sound as shown in FIGS. 26A and 26B, and stores them as a differential spectrum. Those processes are made by executing the module 205 shown in FIG. 17.

Figure 30:
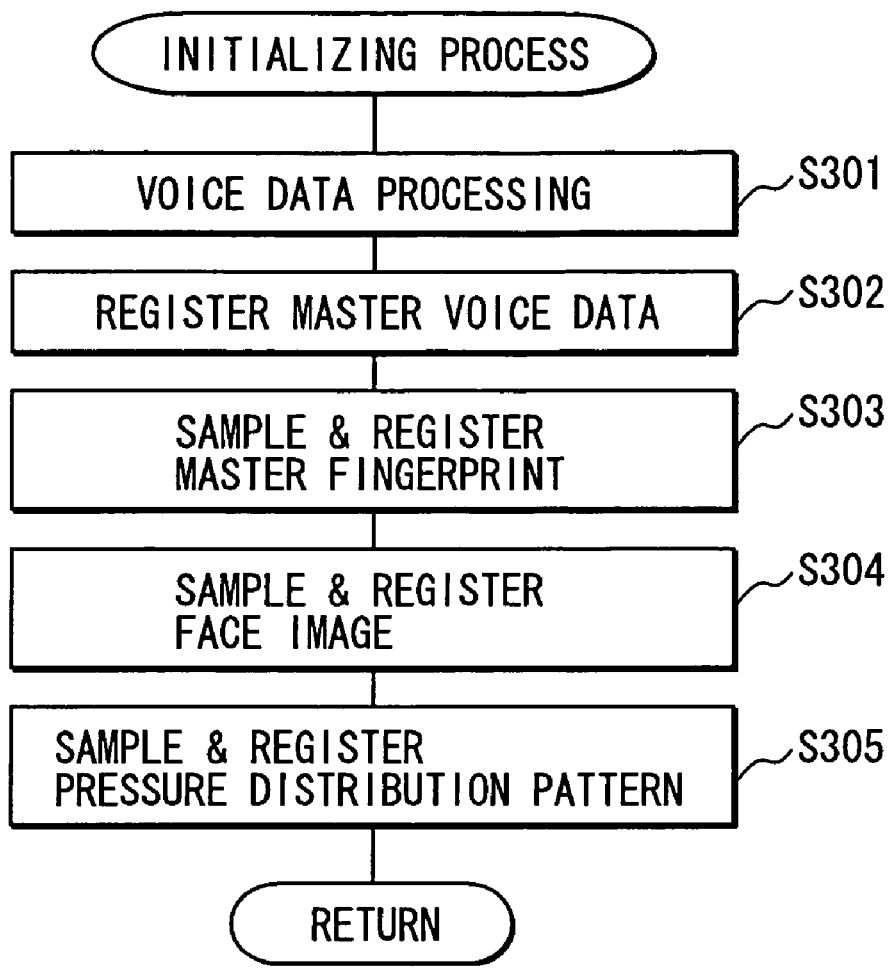
FIG. 30 is a flowchart of initialization process.

FIG. 30 shows a flowchart of the initializing processes. At a step S301, the user terminal 1 executes the voice data processing. In the voice data processing, the user terminal 1 imports the voice of the legitimate user as a reference for authentication, and composes the phase difference, the frequency spectra, and the differential spectrum in the methods described above. At a step S302, the user terminal 1 stores the composed data to the EEPROM 322 shown in FIG. 2, as master data. The master data, the phase difference, the frequency spectra, and the differential spectrum are respectively referred to as a standard voice attribute, a standard phase difference, standard phase spectra, and a standard differential spectrum. At steps S303- , the user terminal 1 respectively obtains the master data for face images 241 shown in FIG. 18, the master data for fingerprints 243 shown in FIG. 19, and the master data for pressure distributions 245 shown in FIG. 20, from the face camera 341, the fingerprint detector 342, and the surface touch sensor 343, and stores the obtained data.

Next, the voice recognition will be described. The user terminal 1 simultaneously obtains the bone conduction sound and the air conduction sound as authentication attributes, for example, as described below. Firstly, the user terminal 1 imports the designated voice which the user produced for the authentication. Then the user terminal 1 executes the voice data processing described above and calculates the phase difference φ. The user terminal 1 compares the phase difference φ with the standard phase difference φst which is stored as the master data. In this embodiment, the user terminal 1 calculates a difference φ−φst. The user terminal 1 determines whether the phase displacement between φ and φst is within a permissible range. If the displacement is in the permissible range, the user terminal 1 sets the authentication flag as "allowed", whereas the user terminal 1 sets the flag as "not allowed" in other cases.

A permissible phase range including the standard phase difference φst can be alternatively stored in place of the standard phase difference φst (the master data). The permissible phase range is expressed by the upper limit φmax and the lower limit φmin. The user terminal 1 can execute the authentication by determining whether the φ is within the stored permissible phase range.

Figure 23A:
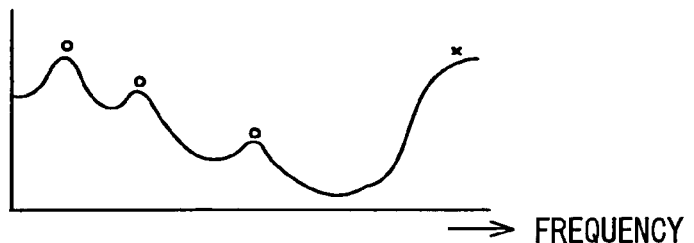
FIGS. 23A to 23C are diagrams, respectively showing frequency spectra of an air conduction sound and a bone conduction sound, and their differential spectrum.
Figure 23B:
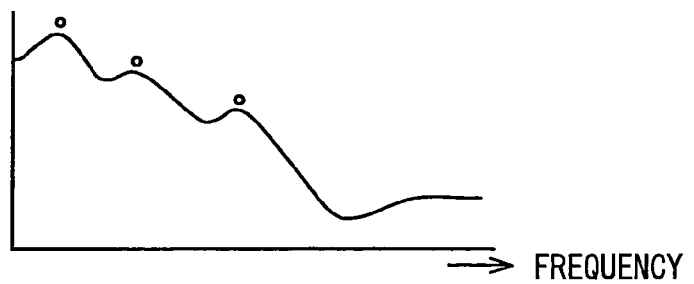
Figure 23C:
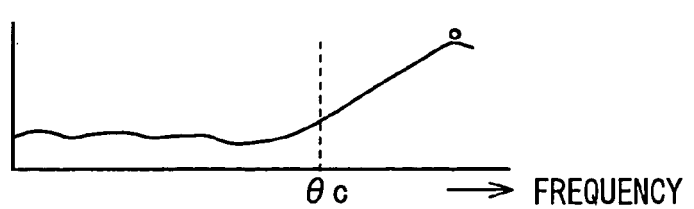
Figure 24:
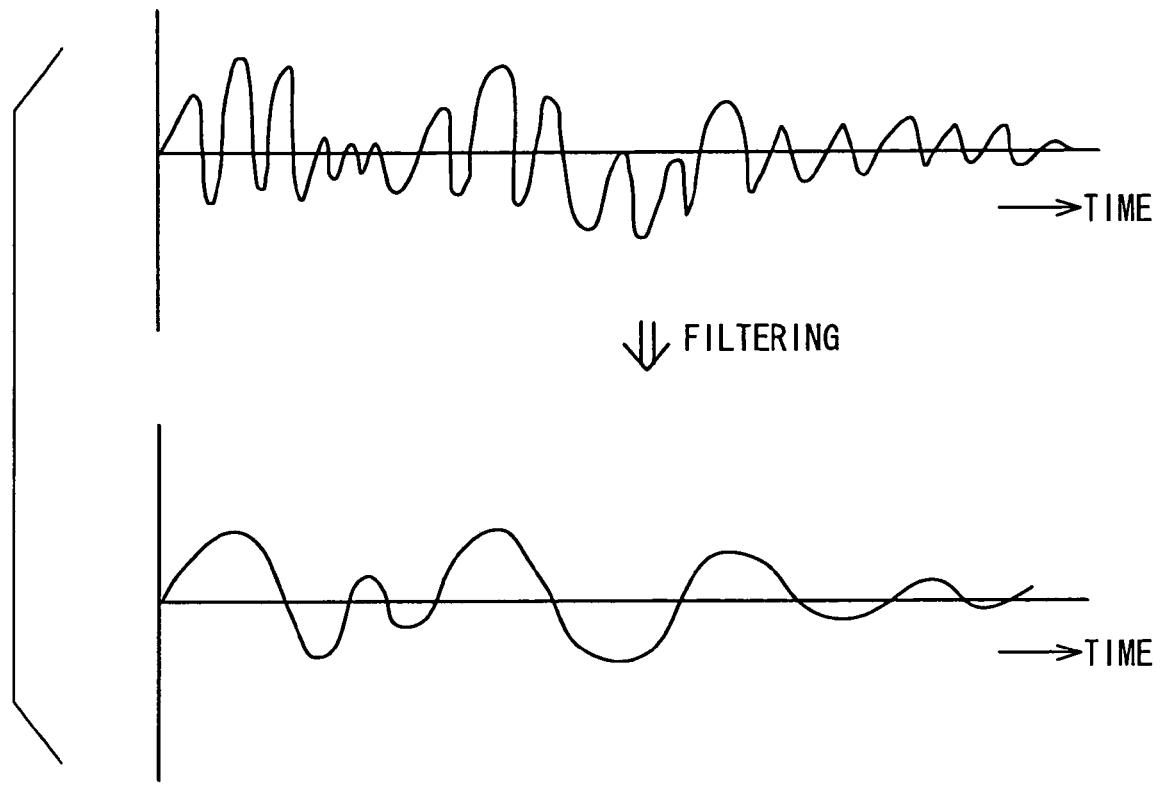
FIG. 24 is a diagram showing a sound wave profile and a filtered wave profile.

As another alternative authentication, the user terminal 1 may read the resultant differential spectrum of the air conduction sound and the bone conduction sound, as shown in FIG. 23C, after the voice recognition. Then the user terminal 1 compares the resultant differential spectrum with the standard differential spectrum 223 shown in FIG. 17. If the user terminal 1 determines that both of the spectra are almost identical to each other, then the user terminal 1 sets the authentication flag as "allowed". If the difference between the spectra is not within a permissible range, then the user terminal 1 sets the authentication flag as "not allowed".

Although the spectrum of the air conduction sound and the spectrum of the bone conduction sound have their main part in common, there is a significant difference in their spectral intensities at specific frequency ranges, as shown in FIGS. 23A and 23B. For example, at the higher frequency range, the air conduction sound exceeds the bone conduction sound in spectral intensity. Therefore, the verification of the identity can be made by comparing the resultant differential spectrum with the standard differential spectrum at the specific frequency ranges. For example, there is a peak of a spectral envelope, as indicated by a cross mark X in FIG. 23A, in the air conduction sound, whereas there is no such peak in the bone conduction sound. In the case that position of the peak varies by individual, the user terminal 1 can easily detect the peak by using the differential spectrum and execute the authentication and identification with high accuracy by verifying the position of the peak.

The voice recognition can be further carried out in an alternative manner, in which the air conduction sound and the bone conduction sound are separately compared with the master data. As shown in FIGS. 23A and 23B, both the air conduction sound and the bone conduction sound have specific peaks in their envelopes whose positions depend on the content of the voice. Therefore it is able to determine whether the inputted voice is the same as the voice included in the master data, according to the number and the positions of the peaks. Thus the voice recognition can be made. If the contents of the voices are the same, the user terminal 1 can compare the position and intensity of the peaks with the master data, and authenticate whether or not the user is the legitimate user by the result of the comparison. Thus the talker recognition can be made.

Figure 31:
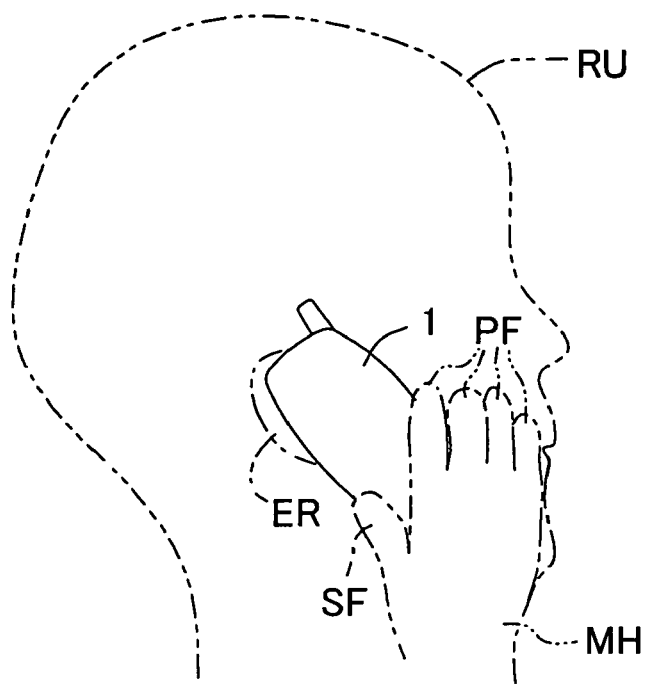
FIG. 31 is a schematic view showing an on-face holding state.
Figure 32:
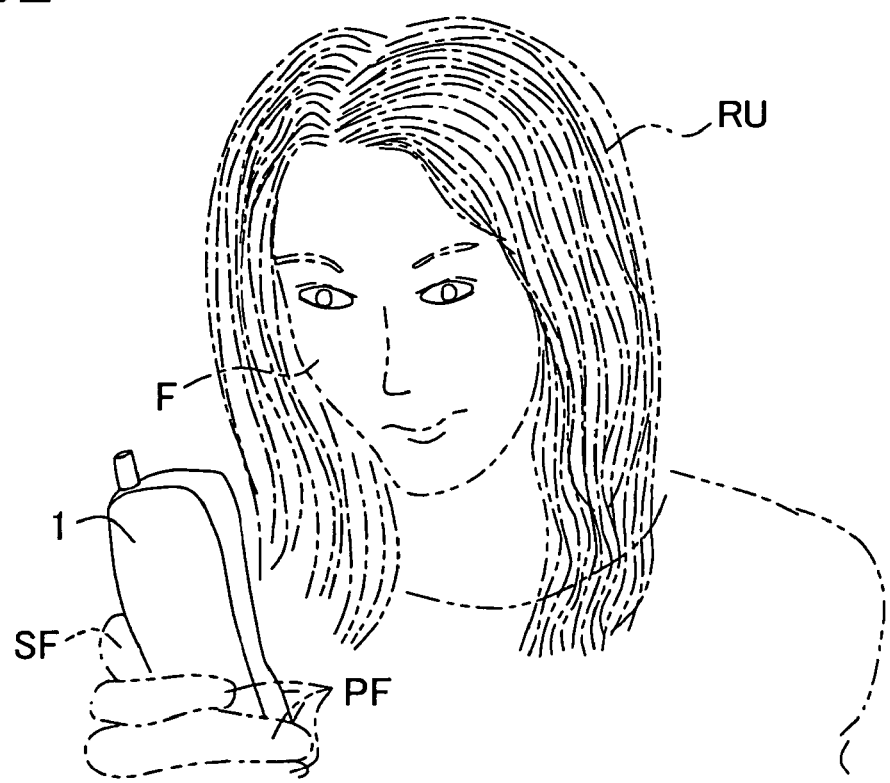
FIG. 32 is a schematic view showing an off-face holding state.

In the above example, the cellular phone 1 is used in an on-face holding state, where, as shown in FIG. 31, the receiver of the cellular phone 1 is put on the face at the phone call holding state. The air conduction sound and the bone conduction sound are detected in the on-face holding state to carry out the authentication. However, the phone call holding state includes an off-face holding state, as shown in FIG. 32, wherein the cellular phone 1 is separated from the user's face but the display and the face camera thereof are faced to the user's face. The authentication can be also made in the off-face holding state as below.

Figure 33:
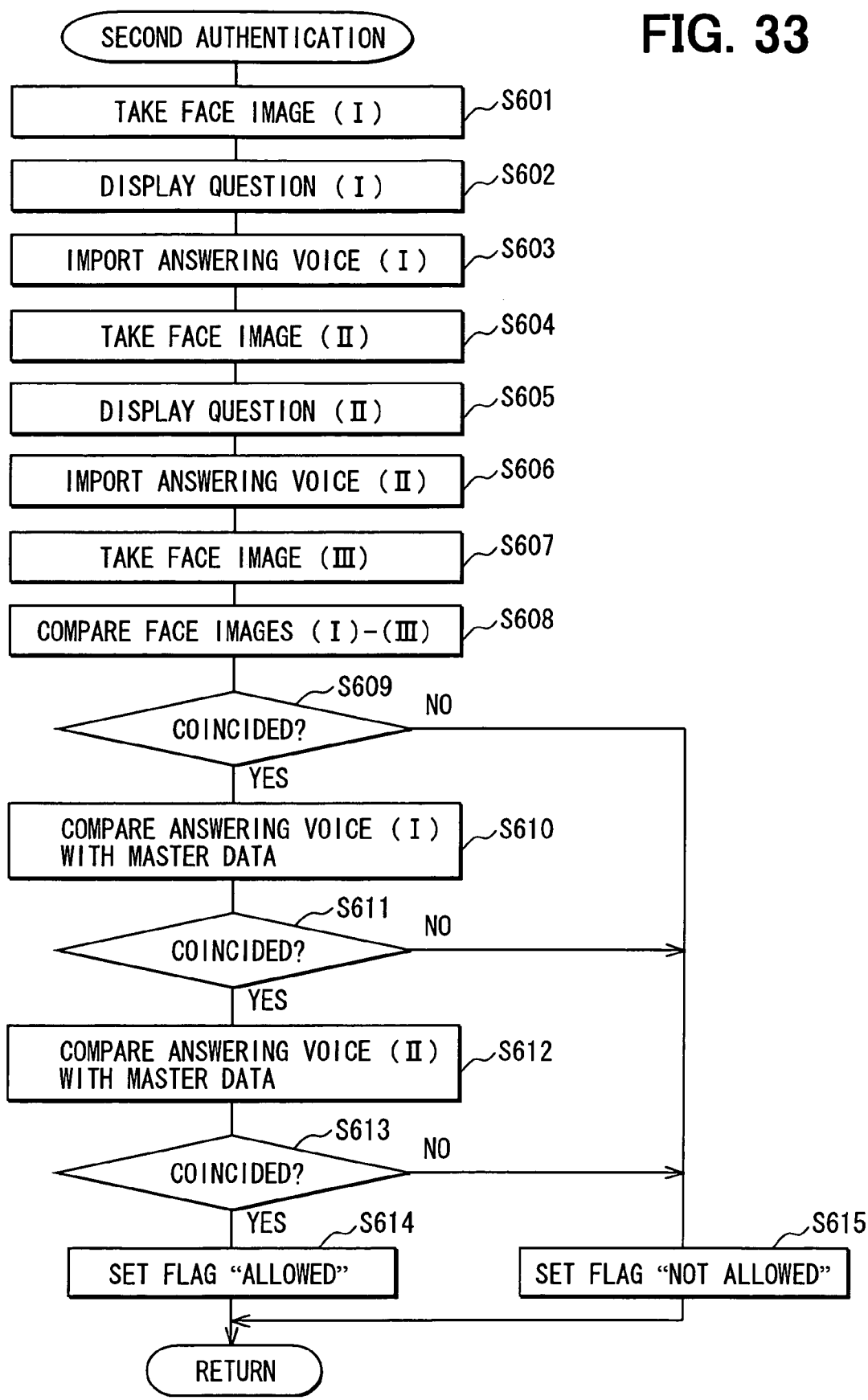
FIG. 33 is a flowchart of another method of the authentication.

FIG. 33 shows a flowchart of the authentication in the above off-face holding state. The air conduction sound and the image of the face are simultaneously obtained as the authentication attributes. At a step S601, the cellular phone 1 takes the image of the face (I). Subsequently, at steps S602-607, the display shows the predetermined question and the user terminal 1 receives the answering voice to the question. The taking the image, the displaying the question, and the receiving the answering voice are repeated twice in this order, and after that the image is further taken for the last time at the step S607. At a step S608, the images (I)-(III) taken three times are compared with the master data of the face image as shown in FIG. 18. At steps S610 and S612, the user terminal 1 compares the spectra of the answering voices (I) and (II) with the corresponding master data. At steps S609, S611 and S613, the user terminal 1 checks the result of the above comparison. The user terminal 1 sets the authentication flag as "allowed", at a step S614, only if all comparison data are the same as the corresponding master data. Thus the authorization is affirmed. Otherwise, the user terminal 1 sets the authentication flag as "not allowed", at a step S615. Thus the authorization is denied.

Figure 34:
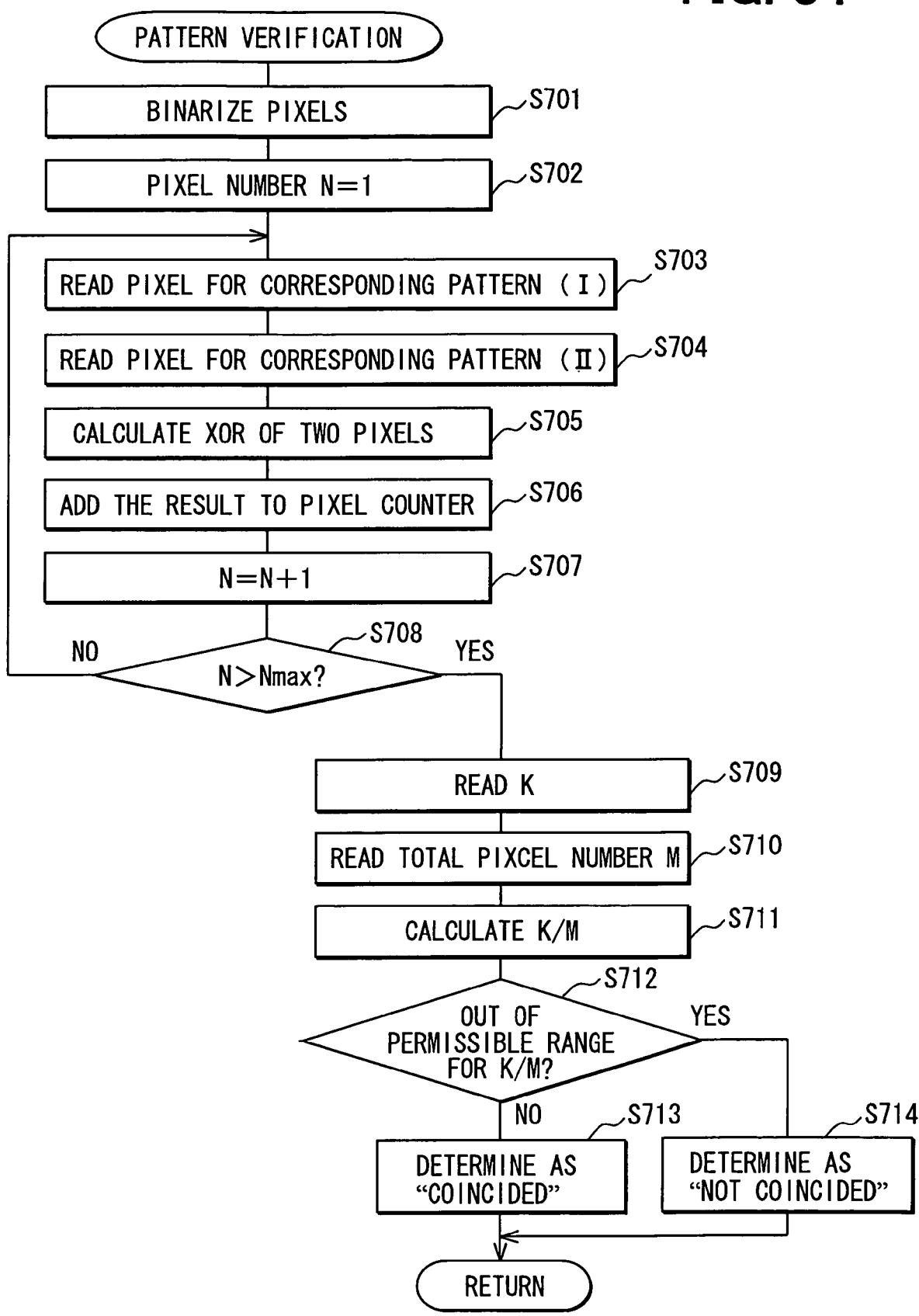
FIG. 34 is a flowchart of pattern verification for detecting movements of face images or biometric information of a hand.

It is not always necessary to compare all of the three face images with the master data. It is preferable to compare either one of the first or the last face image with the master data to execute the authentication, and it is sufficient to use the other two images for the purpose of preventing a false authentication. Thus, two of the three comparison processes can be replaced by pattern verification processes which determine whether the face is within the scope of the face camera. FIG. 34 shows an exemplary flowchart of the pattern verification processes. If the two patterns on the images are color patterns or gray-scale patterns, then the cellular phone 1 converts the patterns to the black and white patterns at a step S701. At steps S703-S705, the user terminal 1 reads a pair of corresponding pixels on the both patterns sequentially and calculates XOR (an exclusive OR) of the value of the pixels (i.e. zero or one). If there is no movement between the two pixels, they have the same value and their XOR becomes zero. If there is a movement between the two pixels, they have different values and their XOR becomes one. The result of each XOR is added to a counter K at a step S707. If the movement is unusual, pairs with different values increases and therefore the counter K increases. At steps S709-714, the final value of the K is divided by the total number of pixels M in the images. If the resultant value is below a threshold, the cellular phone 1 determines that the images match. The cellular phone 1 determines that the images do not match, if the resultant value is larger than the threshold.

The above pattern verification processes are applicable not only to the face images but also to the fingerprint images and the pressure distribution patterns. The contact checking process can be made as below. If the user releases his hand from the cellular phone 1 while the face camera is taking the face image, detected fingerprint images as well as pressure distribution patterns change, and the cellular phone 1 can detect the change and deny the authorization. On the other hand, when the face image disappears from the display, while the user is holding the cellular phone 1 and the cellular phone 1 is detecting the fingerprints and the pressure patterns, the disappearance of the face in the face image will cause the movement between the face image patterns. In this occasion, the cellular phone 1 can also deny the authorization.

As shown in the flowchart in FIG. 33, the cellular phone 1 executes the authentication by means of multiple kinds of authentication attributes. In the flowchart, the authentication attributes are obtained together at an early stage of the processes, and the cellular phone 1 makes the authentication by means of the obtained attributes at a late stage. This will eliminate the redundancy in time because the cellular phone 1 obtains authentication attributes continuously and quickly. Thus, this will prevent a false authentication, in which false attributes are sequentially inputted. The user terminal 1 stepwise obtains the face images, the fingerprint images, the pressure distributions images, and voices. The steps for obtaining the face image, the fingerprint image, and the pressure distributions image are nothing but steps of obtaining just a pattern, and it only takes roughly 1-10 microseconds to complete each of the steps. Thus one second is sufficient to obtain the above three kinds of attributes. On the other hand, it takes about 3-20 seconds to import a voice phrase. Thus, the ratio of the redundancy time to the whole authentication process is suppressed far below 50 percents. The user terminal 1 does not give a possible undue person a sufficient time to use false attributes.

The authentication processes can be further modified in the following manner. For example, before executing the step S601, the cellular phone 1 makes the display 542 to show the viewfinder image of the face camera 341 and urges the user to place his face properly. The process goes to the steps S601 to S607, only if the user gives an activation signal to the cellular phone 1, for example, by pushing a confirmation button. And the steps S601-607 are carried out at a time without stopping by the user's operation. The steps S603 and S605 can be designed to proceed to the following step S604 and S607 after a predetermined short period, since the questions at the steps S602 and S605 should be quickly answered if it is the legitimate user. The processes at S601, S604 and S607 for taking the face images are completed in microseconds. Thus, the (undue) user just feels that he has to answer by producing an answering voice immediately after a question is displayed. And the (undue) user does not recognize that images of his face are taken by the camera a number of times, unless a clicking sound of a shatter is generated or a shot image is displayed on the display. As a result, the (undue) user simply feels that the authentication process has been completed by making simple communications with the user terminal like talking, without recognizing that the user terminal 1 is executing complex processes such as image verifications in its interior.

In the case that the redundancy time is shortened as in the above manner, the information of the fingerprints and/or pressure distribution may be inputted into the user terminal 1 by the (undue) user, when a certain time has passed by from the redundancy time after the face image had been taken at the first time (S601). Namely, the above information may be inputted into the user terminal 1, when the authentication process has proceeded to the next step for taking the face image at the second time (S604). This means that the time period for detecting the information of the fingerprints and/or pressure distribution has passed over, and that the cellular phone 1 was not properly held by the (undue) user during such time period.

For example, the welcoming controller 50 may determine the distance between the user terminal 1 and the automobile according to the location information of the user terminal 1 and on the location information of a base station with which the communication device 501 of the automobile is establishing a connection.

Thus, the welcoming controller 50 may determine the distance between the user terminal 1 and the automobile according to the location information of one of the user terminal 1 and the automobile and according to the access area information of the base station with which the other one is establishing the connection. Since the automobile and the user terminal 1 are connected to the network by establishing the connection with the base station, their locations are easily determined to be within the cover area of the corresponding base station once the base station is identified.

What is claimed is:

1. A system for welcoming a user of an automobile comprising:
   a host communication means installed in at least one of a parking automobile and facilities around the parking automobile;
   a user terminal carried by the user, for communicating with the host communication means through a communication network;
   a distance detecting means provided in the automobile for detecting a distance between the user and the parking automobile;
   a welcoming operating means provided in one of the parking automobile and the facilities around the parking automobile, for performing one of welcoming operations, which comprise an operation of guiding the user to the parking automobile, an operation of assisting the user in getting into the automobile, and an operation of providing various services to the user having got into the automobile; and
   a welcoming control means provided in the automobile for selecting and changing contents of the welcoming operations, depending on the detected distance between the user and the parking automobiles,
   wherein the selected contents of the welcoming operations are automatically carried out when the detected distance between the user and the parking automobile becomes smaller than a reference value. independently from an operation of the user terminal.

2. The system according to claim 1, wherein the welcoming control means changes the contents of the welcoming operations in a stepwise manner, in which one of the welcoming operations already in operation will be terminated, or one of the welcoming operations not yet in operation will be started.

3. The system according to claim 1, wherein the welcoming operating means comprises a lighting device.

4. The system according to claim 3, wherein the welcoming control means decreases total intensity of the light from the lighting device in accordance with a decrease of the detected distance between the user and the parking automobile.

5. The system according to claim 3, further comprising:
   a direction detecting means for detecting a relative approaching direction of the user with respect to the automobile,
   wherein the welcoming control means operates one of the lighting devices, which is provided in the automobile and arranged at the relative approaching direction.

6. The system according to claim 1, wherein the welcoming control means operates the welcoming operating means, when the detected distance between the user and the parking automobile becomes smaller than a first predetermined distance, so that the welcoming control means notifies a parking location of the automobile to the user.

7. The system according to claim 6, wherein the first predetermined distance is selected from a range of 100 to 400 m.

8. The system according to claim 6, wherein
   the welcoming operating means comprises one of the following lighting devices;
   a light provided at the facilities around the parking automobile for lighting up the parking automobile;
   a head lamp of the automobile;
   a hazard lamp of the automobile; and
   a room lamp of the automobile.

9. The system according to claim 6, wherein the welcoming control means operates the welcoming operating means to guide the user toward the parking automobile, when the detected distance between the user and the parking automobile becomes smaller than a second predetermined distance, which is smaller than the first predetermined distance.

10. The system according to claim 9, wherein the second predetermined distance is selected from a range of 3 to 50 m.

11. The system according to claim 9, wherein the welcoming operating means comprises one of the following lighting devices provided in the automobile: a head lamp; a fog lamp; a hazard lamp; a cornering lamp; a tail lamp; a stop lamp; a backup lamp; and a room lamp.

12. The system according to claim 1,
    wherein the welcoming operating means comprises an air conditioning apparatus mounted in the automobile,
    wherein the welcoming control means starts an operation of the air conditioning apparatus, upon receiving a command signal from the user terminal, before the user approaches to the automobile.

13. The system according to claim 1,
    wherein the welcoming operating means comprises a music stereo device provided in the automobile,
    wherein the welcoming control means starts an operation of the music stereo device, so that a pre-selected music is played when the user is getting into the automobile.

14. The system according to claim 1, wherein the welcoming control means starts an operation of the welcoming operating means upon receiving a command signal from the user terminal.

15. The system according to claim 14, wherein
    the user terminal comprises an authenticating means for authenticating the user, and the command signal is transmitted to the host communication means, only when the authentication is correctly completed.

16. A system for welcoming a user of an automobile comprising:
- a host communication means installed in at least one of a parking automobile and facilities around the parking automobile;
- a user terminal carried by the user, for communicating with the host communication means through a communication network;
- a welcoming operating means provided in one of the parking automobile and the facilities around the parking automobile, for performing one of welcoming operations, which comprise an operation of guiding the user to the parking automobile, an operation of assisting the user in getting into the automobile, and an operation of providing various services to the user having got into the automobile; and
- a welcoming control means provided in the automobile for selecting and changing contents of the welcoming operations, depending on a distance between the user and the parking automobile,
- wherein the selected contents of the welcoming operations are automatically carried out when the detected distance between the user and the parking automobile becomes smaller than a reference value. independently from an operation of the user terminal.

17. The system according to claim 16, wherein the welcoming control means calculates the distance between the user and the parking automobile, based on information which is received at the host communication means from the communication network.

18. A system for welcoming a user of an automobile comprising:
- a host communication means installed in an automobile;
- a distance detecting means provided in the automobile for detecting a distance between the user and the parking automobile;
- a welcoming operating means provided in the automobile, for performing one of welcoming operations, which comprise an operation of guiding the user to the parking automobile, an operation of assisting the user in getting into the automobile, and an operation of providing various services to the user having got into the automobile; and
- a welcoming control means provided in the automobile for selecting and changing contents of the welcoming operations, depending on the detected distance between the user and the automobile,
- wherein the selected and changed contents of the welcoming operations are automatically carried out when the detected distance between the user and the parking automobile becomes smaller than a reference value indendently from an operation of the user terminal.

* * * * *